(12) United States Patent
O'Shea

(10) Patent No.: US 6,324,472 B1
(45) Date of Patent: *Nov. 27, 2001

(54) MANEUVER GENERATION PROGRAM AND METHOD

(75) Inventor: Michael J. O'Shea, Chicago, IL (US)

(73) Assignee: Navigation Technologies Corporation ( * ) Notice: Subject to any disclaimer, the term of this patent is extended or adjusted under 35 U.S.C. 154(b) by 0 days.

This patent is subject to a terminal disclaimer.

(21) Appl. No.: 09/716,489

(22) Filed: Nov. 20, 2000

Related U.S. Application Data

(63) Continuation of application No. 08/893,201, filed on Jul. 15, 1997, now Pat. No. 6,199,013.

(51) Int. Cl.[7] ................................................. G06F 165/00
(52) U.S. Cl. ..................... 701/211; 701/25; 701/207; 701/214; 340/988
(58) Field of Search ............................ 701/25, 207, 211, 701/214, 206, 210, 300; 340/988, 990, 995; 342/357.01; 73/178 R

(56) References Cited

U.S. PATENT DOCUMENTS

| | | |
|---|---|---|
| 3,925,641 | 12/1975 | Kashio . |
| 4,242,731 | 12/1980 | Mizote et al. . |
| 4,350,970 | 9/1982 | von Tomkewitsch . |
| 4,357,593 | 11/1982 | von Tomkewitsch . |
| 4,679,147 | 7/1987 | Tsujii et al. . |
| 4,937,570 | 6/1990 | Matsukawa et al. . |
| 4,937,751 | 6/1990 | Nimura et al. . |
| 4,939,662 | 7/1990 | Nimura et al. . |
| 4,951,211 | 8/1990 | De Villeroche . |
| 5,115,398 | 5/1992 | De Jong . |
| 5,121,326 | 6/1992 | Moroto et al. . |
| 5,177,685 | 1/1993 | Davis et al. . |
| 5,184,123 | 2/1993 | Bremer et al. . |
| 5,270,936 | 12/1993 | Fukushima et al. . |
| 5,323,321 | 6/1994 | Smith, Jr. . |
| 5,371,497 | 12/1994 | Nimura et al. . |
| 5,398,189 | 3/1995 | Inoue et al. . |
| 5,402,120 | 3/1995 | Fuji et al. . |
| 5,408,415 | 4/1995 | Inoue et al. . |

(List continued on next page.)

FOREIGN PATENT DOCUMENTS

WO 96/06326 2/1996 (WO) .

Primary Examiner—William A. Cuchlinski, Jr.
Assistant Examiner—Gertrude Arthur
(74) Attorney, Agent, or Firm—Frank J. Kozak; Lawrence M. Kaplan

(57) ABSTRACT

A maneuver generation program for a computer-based navigation system. The navigation system provides a user with a series of maneuvering instructions to go from a first location to a second location in a geographic area. The series of maneuvering instructions are derived from a list of data entities that represent a route from the first location to the second location. The list of data entities includes data that represent a plurality of locations along the route at which maneuvering instructions may be provided. The maneuver generation program determines one and preferably no more than one maneuver type selected from a predetermined plurality of maneuver types for each location of the plurality of locations along the route. The maneuver generation program performs a series of tests upon data corresponding to each location. Each of the plurality of maneuver types is characterized by a unique set of tests selected from a predetermined superset of tests. A maneuver type is associated with a location if data corresponding to the location pass all the tests in the set of tests that characterize the maneuver type. The maneuver type associated with the location is used in providing a maneuvering instruction related to the location to the user by the navigation application.

20 Claims, 13 Drawing Sheets

U.S. PATENT DOCUMENTS

| | | |
|---|---|---|
| 5,410,486 | 4/1995 | Kishi et al. . |
| 5,412,573 | 5/1995 | Barnea et al. . |
| 5,414,630 | 5/1995 | Oshizawa et al. . |
| 5,430,655 | 7/1995 | Adachi . |
| 5,452,212 | 9/1995 | Yokoyama et al. . |
| 5,452,217 | 9/1995 | Kishi et al. . |
| 5,459,667 | 10/1995 | Odagaki et al. . |
| 5,465,089 | 11/1995 | Nakatani et al. . |
| 5,508,930 | 4/1996 | Smith, Jr. . |
| 5,537,323 | 7/1996 | Schulte . |
| 5,583,775 | 12/1996 | Nobe et al. . |
| 5,587,911 | 12/1996 | Asano et al. . |
| 5,612,881 | 3/1997 | Moroto et al. . |
| 5,612,882 | 3/1997 | LeFebvre et al. . |
| 5,629,854 | 5/1997 | Schulte . |
| 5,974,419 | 10/1999 | Ashby . |
| 6,199,013 * | 3/2001 | O'Shea ................................ 701/211 |

* cited by examiner

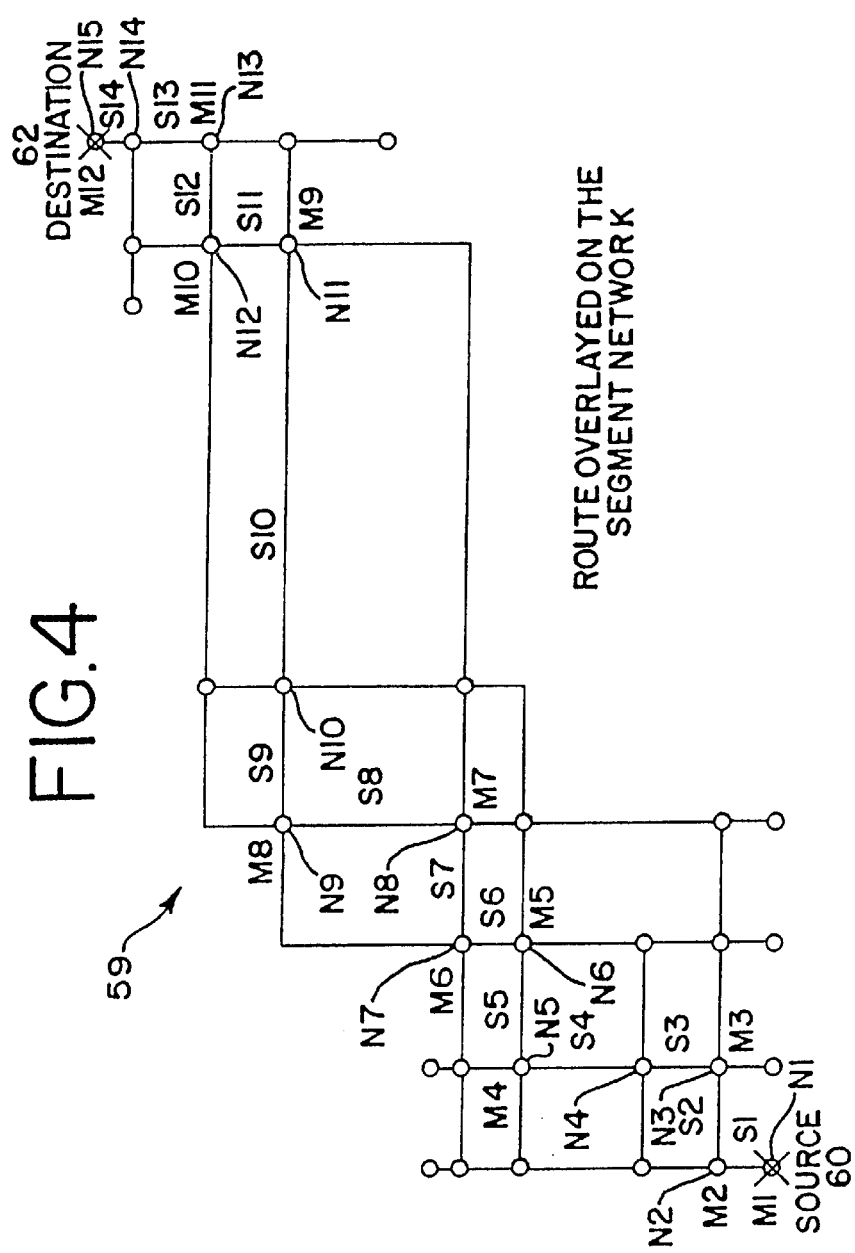
FIG. 3
FIG. 4
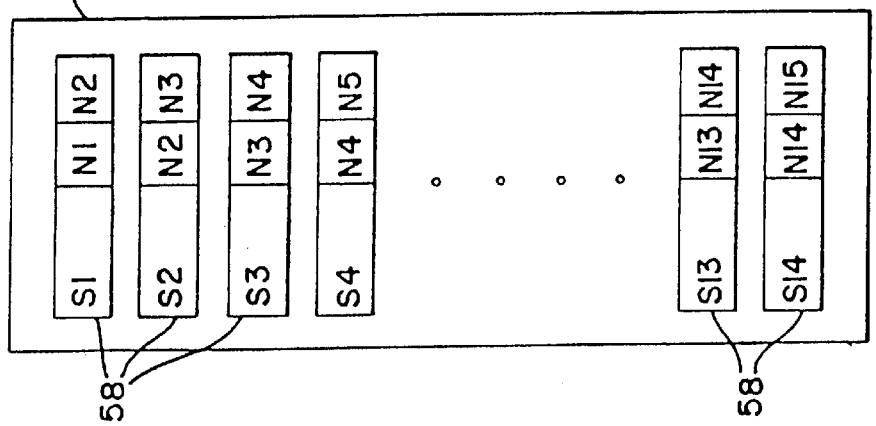

FIG. 6A-8
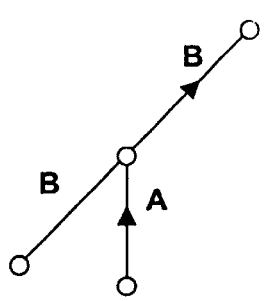
FIG. 6A-9
FIG. 6A-10
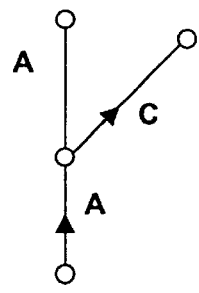
FIG. 6A-11
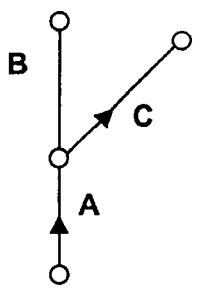
FIG. 6-A12
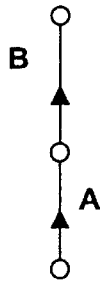
FIG. 6A-13
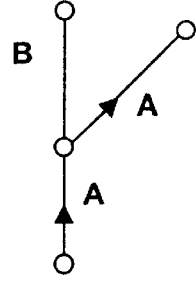
FIG. 6A-14
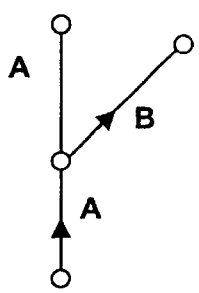
FIG. 6A-15
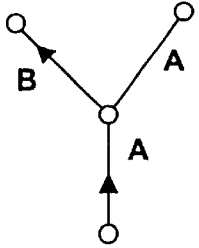
FIG. 6A-16
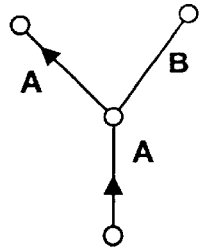
FIG. 6A-17
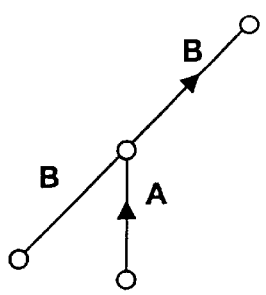
FIG. 6A-18
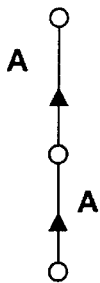
FIG. 6A-19
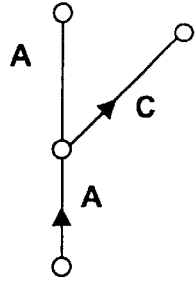

FIG. 7A

| Category | Condition | 1 | 2 | 3 | 4 | 5 | 6 | 7 |
|---|---|---|---|---|---|---|---|---|
| OUTPUT | DON'T RETURN | | | X | | | | |
| | RETURN AS ADVISORY | | | | | | | |
| | RETURN AS MANEUVER | X | X | | X | X | X | X |
| INACCESSIBLE SEGMENTS | SAME NAME AS EXIT | | | | | | | |
| | ONE OR MORE | | | | | | X | X |
| | NONE | | | | | | | |
| ACCESSIBLE SEGMENTS (EXCLUDING EXIT SEGMENT) | ONE OR MORE CONTROLLED ACCESS | | | | | | | |
| | ONE OR MORE RAMP | | | | | | | |
| | ONE OR MORE STREET | | | | X | | X | X |
| | ONE OR MORE WITH SAME NAME AS ENTRY | | | | | | | |
| | NONE WITH SAME NAME AS ENTRY | | | | | | | |
| | ONE OR MORE | | | | | | | |
| | ONLY ONE | | | | | | X | X |
| | NONE | | | X | | | | |
| EXIT SEGMENT | EXIT ON LEFT | | | | | | | |
| | EXIT ON RIGHT | | | | | | | |
| | RANK >= ENTRY RANK | | | | | | | |
| | RANK < ENTRY RANK | | | | | | | |
| | DIFFERENT NAME TO ENTRY | | X | X | | X | | X |
| | SAME NAME AS ENTRY | X | | | X | | X | |
| | NOT A TOLL | | | | | | | |
| | TOLL | | | | | | | |
| | NOT A TUNNEL | | | | | | | |
| | TUNNEL | | | | | | | |
| | NOT A BRIDGE | | | | | | | |
| | BRIDGE | | | | | | | |
| | NOT A RAIL FERRY | | | | | | | |
| | RAIL FERRY | | | | | | | |
| | NOT A BOAT FERRY | | | | | | | |
| | BOAT FERRY | | | | | | | |
| | NOT A ROUNDABOUT | X | X | X | X | X | X | X |
| | ROUNDABOUT | | | | | | | |
| | CONTROLLED ACCESS | | | | | | | |
| | RAMP | | | | | | | |
| | STREET | X | X | X | X | X | X | X |
| ENTRY SEGMENT | NOT A TOLL | | | | | | | |
| | TOLL | | | | | | | |
| | NOT A TUNNEL | | | | | | | |
| | TUNNEL | | | | | | | |
| | NOT A BRIDGE | | | | | | | |
| | BRIDGE | | | | | | | |
| | NOT A RAIL FERRY | | | | | | | |
| | RAIL FERRY | | | | | | | |
| | NOT A BOAT FERRY | | | | | | | |
| | BOAT FERRY | | | | | | | |
| | NOT A ROUNDABOUT | X | X | X | X | X | X | X |
| | ROUNDABOUT | | | | | | | |
| | CONTROLLED ACCESS | | | | | | | |
| | RAMP | | | | | | | |
| | STREET | X | X | X | X | X | X | X |
| TURN ANGLE | ONE OR MORE SEGMENTS | | | | | X | X | |
| | NOT SIGNIFICANT ANGLE | X | X | | | | | |
| | SIGNIFICANT ANGLE | | | | X | X | | |
| | NOT A U-TURN | | | | X | X | | |
| | U-TURN | | | | | | | |
| | NOT A MERGE | | | | | | | |
| | MERGE | | | | | | | |
| | NOT A FORK | | | | | | | |
| | FORK | | | | | | X | X |
| MANEUVER TYPE | | 1 | 2 | 3 | 4 | 5 | 6 | 7 |
| | | STAY STRAIGHT TO REMAIN ON STREET A | STAY STRAIGHT TO GO ONTO STREET B | STREET A BECOMES STREET B | TURN TO STAY ON STREET A | TURN ONTO STREET B | BRANCH (FORK) TO STAY ON STREET A | BRANCH (FORK) TO GO ONTO STREET B |

FIG. 7B

| | 8 | 9 | 10 | 11 | 12 | 13 | 14 | 15 | 16 | 17 | 18 | 19 | 20 | 21 | 22 |
|---|---|---|---|---|---|---|---|---|---|---|---|---|---|---|---|
| STREET A MERGES ONTO STREET B | | | | | | | | | | | | | | | |
| U TURN ON STREET A | | x | | | | | | | | | | | | | |
| STAY STRAIGHT TO GO ONTO RAMP A (FROM A RAMP) | | | x | x | | x | x | x | x | | | | | | |
| STAY STRAIGHT TO GO ONTO RAMP B (FROM A RAMP) | | | x | x | x | x | x | x | x | | | | | | |
| RAMP A BECOMES RAMP B | | | | x | x | x | x | | x | x | | | | | |
| TURN TO STAY ON RAMP A | | | | | | | | | | | x | x | x | x | x |
| TURN TO GO ONTO RAMP B (FROM A RAMP) | | | | | | | | | | | | | | | |
| BRANCH (FORK) TO STAY ON RAMP A | | | | | | | | | | | | | | | |
| BRANCH (FORK) TO TURN ONTO RAMP B | | | | | | | | | | | | | | | |
| RAMP A MERGED ONTO RAMP B | | | | | | | | | | | | | | | |
| STAY STRAIGHT TO STAY ON CONTROLLED ACCESS A | | | | | | | | | | | | | | | |
| STAY STRAIGHT TO STAY ON CONTROLLED ACCESS A (AT FUNCTION OF SEVERAL CONTROLLED ACCESS) | | | | | | | | | | | | | | | |
| STAY STRAIGHT TO GO ONTO CONTROLLED ACCESS B (FROM A CONTROLLED ACCESS) | | | | | | | | | | | | | | | |
| CONTROLLED ACCESS A BECOMES CONTROLLED ACCESS B | | | | | | | | | | | | | | | |
| TURN TO STAY ON CONTROLLED ACCESS A | | | | | | | | | | | | | | | |

| | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|
| EXIT CONTROLLED ACCESS ON THE LEFT | 36 | | | | | | | | x | | | | | | | | | | | | | | | | | | | | | |
| RAMP A BECOMES CONTROLLED ACCESS B | 37 | | | x | | | | | | | | | | | | | | | | | | | | | | | | x | | |
| STAY STRAIGHT TO GO ONTO CONTROLLED ACCESS B (FROM A RAMP) | 38 | | | | x | | | | x | | | | | | | | | | | | | | | | | | | | | |
| TURN ONTO CONTROLLED ACCESS B (FROM A RAMP) | 39 | | | | | x | | | x | | | | | | | | | | | | | | | | | | | | | |
| RAMP A MERGES ONTO CONTROLLED ACCESS B | 40 | | | | | | | | x | | | | | | | | | | | x | | | | | | x x x | | | |
| ENTERING A TOLL ROAD | 41 | | | | | | | | | | | x | | | | | | | | | | | | | | | | | | |
| ENTERING A TUNNEL | 42 | | | | | | | | | | | | x | | | | | | | | | | | | | | | | | |
| ENTERING A BRIDGE | 43 | | | | | | | | | | | | | x | | | | | | | | | | | | | | | | |
| ENTERING A ROUNDABOUT | 44 | | | | | | | | | | | | | | x | | | x | | | | | | | | | | | | |
| EXITING A ROUNDABOUT | 45 | | | | | | | | | | | | | | | x | | x | | | | | | | | | | | | |
| ENTERING A BOAT FERRY | 46 | | | | | | | | | | | | | | | | x | | | | | | | | | | | | | |
| EXITING A BOAT FERRY | 47 | | | | | | | | | | | | | | | | | x | | | | | | | | | | | | |
| ENTERING A RAIL FERRY | 48 | | | | | | | | | | | | | | | | | | x | | | | | | | | | | | |
| EXITING A RAIL FERRY | 49 | | | | | | | | | | | | | | | | | | | x | | | | | | | | | | |

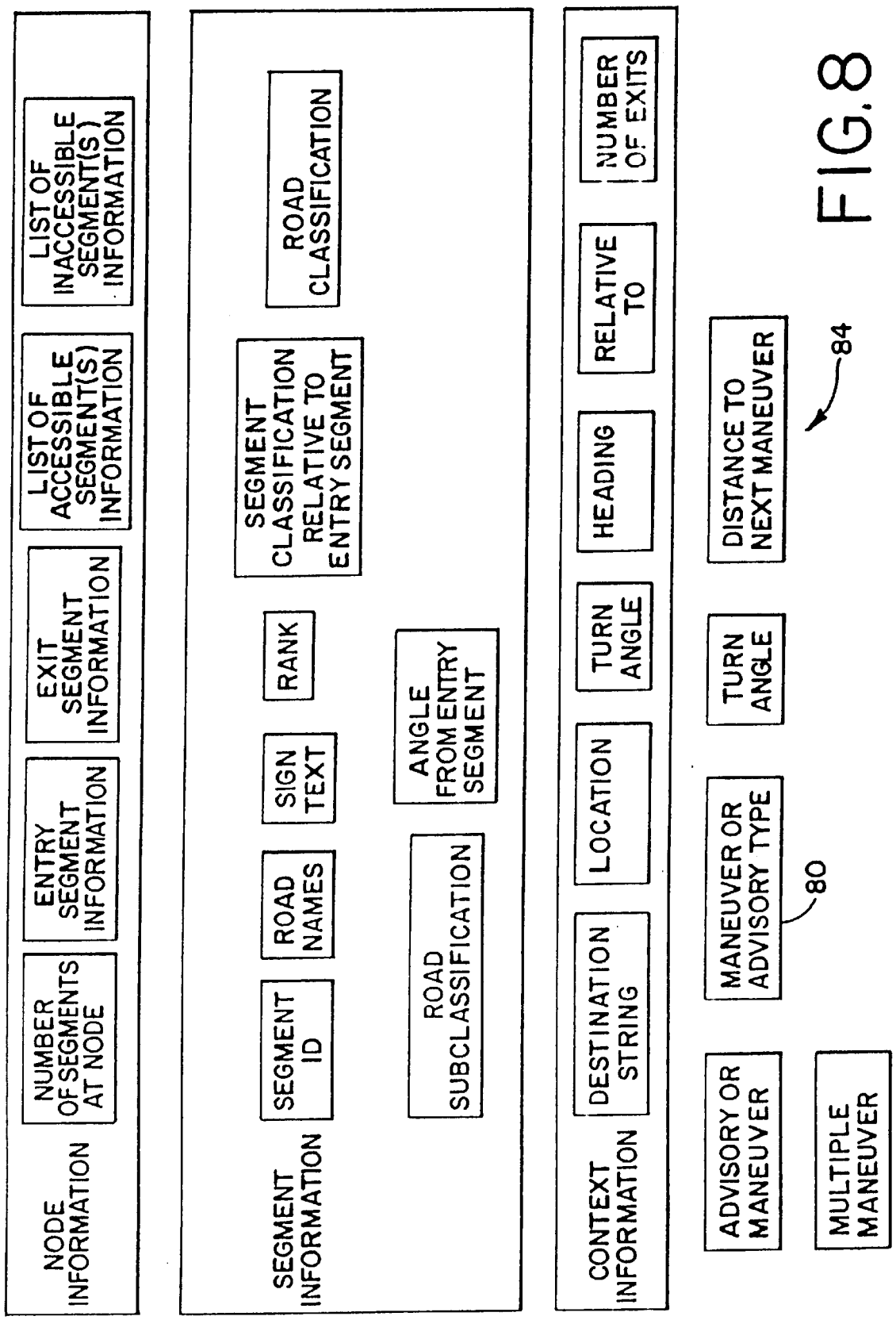

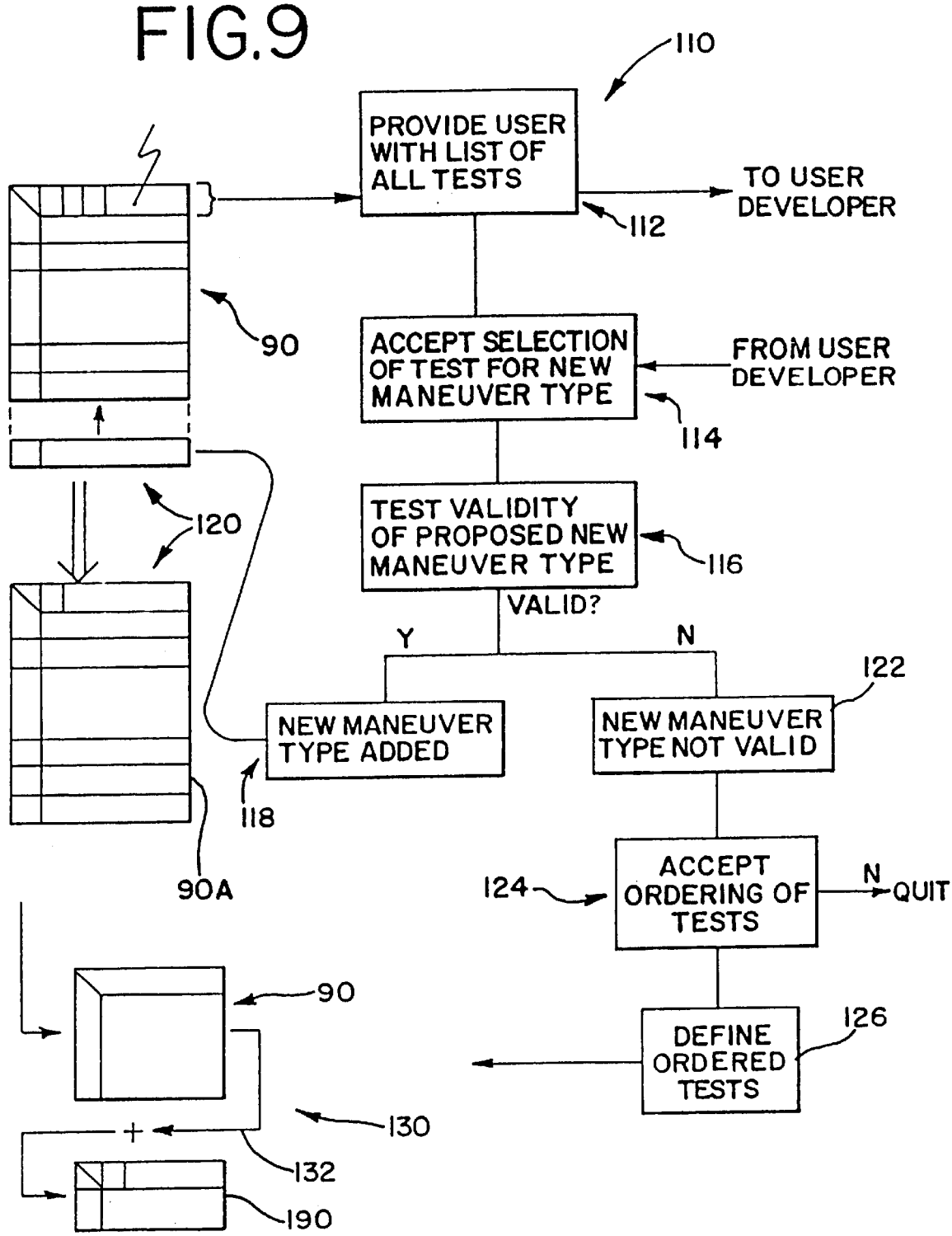

MANEUVER GENERATION PROGRAM AND METHOD

REFERENCE TO RELATED APPLICATION

The present application is a continuation of Ser. No. 08/893,201, filed Jul. 15, 1997 U.S. Pat. No. 6,199,013, the entire disclosure of which is incorporated herein by reference.

BACKGROUND OF THE INVENTION

The present invention relates to navigation systems and in particular to computer-enhanced navigation system that can provide maneuvering instructions for a user of the navigation system.

Computer-based navigation systems for use on land have become available in a variety of forms and provide for a variety of useful features. One exemplary type of navigation system uses (1) a detailed data set of one or more geographic areas or regions, (2) a navigation application program, (3) appropriate computer hardware, such as a microprocessor, memory, and storage, and, optionally, (4) a positioning system. The detailed geographic data set portion of the navigation system is in the form of one or more detailed, organized data files or databases. The detailed geographic data set may include information about the positions of roads and intersections in or related to one or more specific geographic regional areas, and may also include information about one-way streets, turn restrictions, street addresses, alternative routes, hotels, restaurants, museums, stadiums, offices, automobile dealerships, auto repair shops, etc.

The positioning system may employ any of several well-known technologies to determine or approximate one's physical location in a geographic regional area. For example, the positioning system may employ a GPS-type system (global positioning system), a "dead reckoning"-type system, or combinations of these, or other systems, all of which are well-known in the art.

The navigation application program portion of the navigation system is a software program that uses the detailed geographic data set and the positioning system (when employed). The navigation application program may provide the user with a graphical display (e.g. a "map") of the user's specific location in the geographic area. In addition, the navigation application program may also provide the user with specific directions to locations in the geographic area from wherever the user is located.

Some navigation systems combine the navigation application program, geographic data set, and optionally, the positioning system into a single unit. Such single unit systems can be installed in vehicles or carried by persons. Alternatively, navigation application programs and geographic datasets may be provided as software products that are sold or licensed to users to load in their own personal computers. In further alternatives, the navigation system may be centrally or regionally located and accessible to multiple users on an "as needed" basis, or alternatively, on-line via a network or communications link. Personal computer-based systems may be stand-alone systems or may utilize a communication link to a central or regional or distributed system. Also, users may access a navigation system over an on-line service such as the Internet, or over private dial-up services, such as CompuServe, Prodigy, and America Online. In-vehicle navigation systems may use wireless communication connections. Navigation systems may also be used by operators of vehicle fleets such as trucking companies, package delivery services, and so on. Navigation systems may also be used by entities concerned with traffic control or traffic monitoring.

Computer-based navigation systems hold the promise of providing high levels of navigation assistance to users. Navigation systems can provide instructions for traveling to desired destinations, thereby reducing travel times and expenses. Navigation systems also can provide enhanced navigation features such as helping commuters and travelers avoid construction delays and finding the quickest routes to desired destinations. Navigation systems can also be used to incorporate real-time traffic information.

One of the features that can be provided by navigation systems is maneuver guidance. For example, after a navigation system determines a suitable route that can be used to travel from a starting location to a destination location, it would be desirable to provide the user with easy-to-understand instructions —visual, auditory or both visual and auditory—to guide the user. These instructions may take the form of a series of driving maneuvers needed to follow the calculated route. These driving maneuvers may be provided all at once, or preferably may be provided one at a time as the vehicle in which the navigation system is installed is being driven along the calculated route. The maneuver instructions may be provided somewhat in advance of when the maneuver is required in order to prepare the driver for the maneuver. For example, a driving maneuver may consist of an audio message that states "Continue in left lane for one quarter mile and exit onto the ramp to Interstate 290."

Accordingly, there is a need in navigation systems to provide a user with clear, unambiguous, and consistent instructions. Further, it is important in navigation systems to determine a series of maneuver instructions quickly in order to have them ready for a user-driver when needed.

Therefore, it is an objective to provide an improved navigation application maneuver generation feature that provides clear, unambiguous, and consistent instructions quickly and in an efficient manner.

SUMMARY OF THE INVENTION

To address the above concerns, there is provided a maneuver generation program for a computer-based navigation system. The navigation system provides a user with a series of maneuvering instructions to go from a first location to a destination location in a geographic area. The series of maneuvering instructions are derived from a list of data entities that represent a route from the first location to the destination location. The list of data entities includes data that represent a plurality of locations along the route at which maneuvering instructions may be provided. The maneuver generation program determines one and preferably no more than one maneuver type selected from a predetermined plurality of maneuver types for each location of said plurality of locations along the route. The maneuver generation program performs a series of tests upon data corresponding to each location. Each of the plurality of maneuver types is characterized by a unique set of tests selected from a predetermined superset of tests. A maneuver type is associated with a location if data corresponding to the location pass all the tests in a set of tests that characterizes the maneuver type. The maneuver type associated with the location is used in providing a maneuvering instruction related to the location to the user by the navigation application.

BRIEF DESCRIPTION OF THE DRAWINGS

FIG. 3 is a diagram representing the output of the route calculation program of FIG. 1.

FIG. 4 is a diagram of a map illustrating a portion of the geographic area to which the geographic data relates.

FIGS. 6A-1–6A-40 are diagrams of maps illustrating the types of maneuvers being determined by the maneuver generation program of FIG. 2.

Figure 7C:
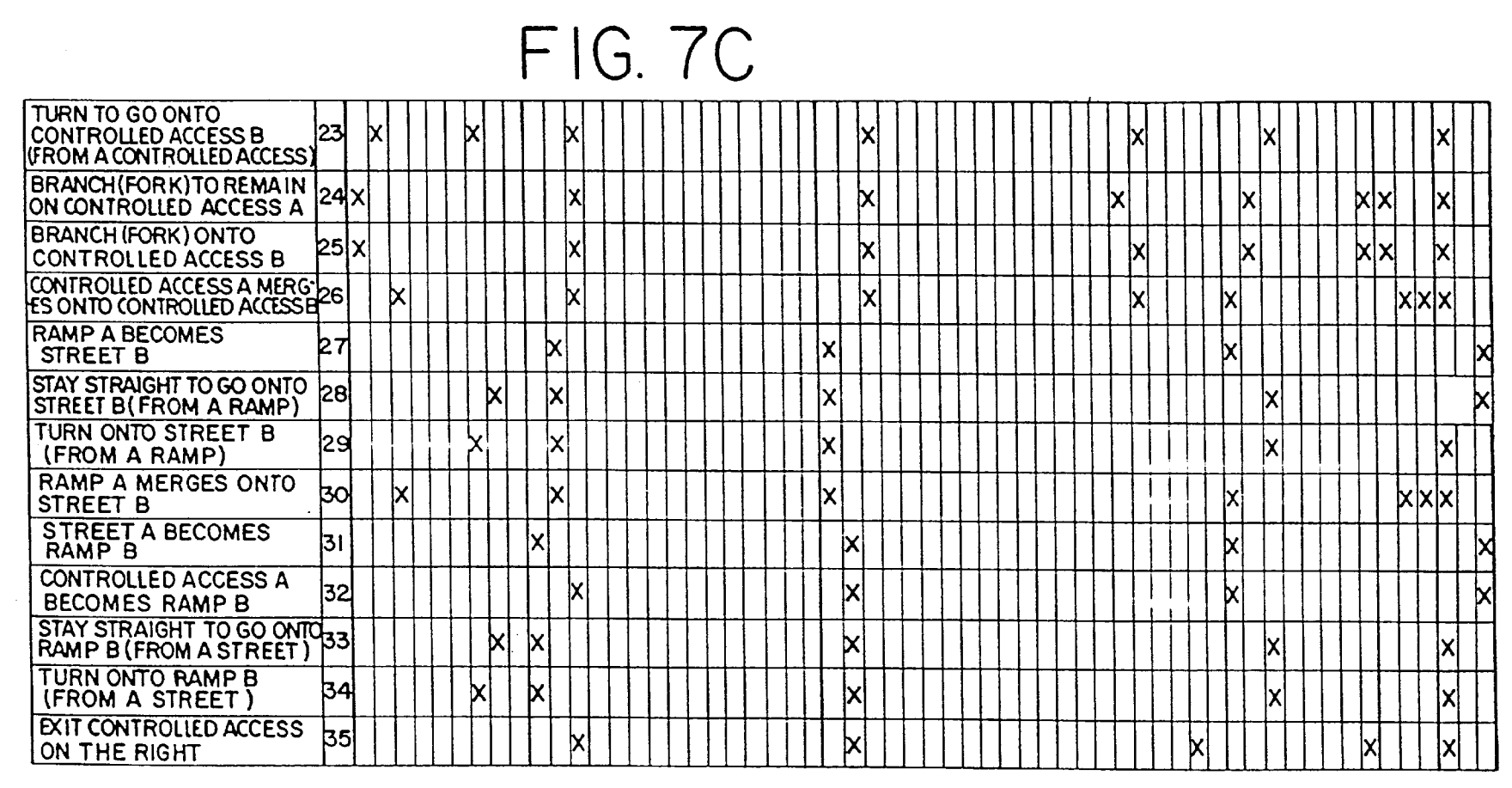

FIGS. 7A–7D show a table representing the tests associated with each of the maneuver types used by the maneuver generation program of FIG. 2.

FIG. 8 is a diagram illustrating the members of the data structure used in the list produced as an output of the maneuver generation program.

FIG. 9 is a block diagram of a function that provides for the addition of new maneuver types in the maneuver generation program of FIG. 2.

DETAILED DESCRIPTION OF THE PRESENTLY PREFERRED EMBODIMENTS

I. Exemplary Navigation System Platform/Environment

Figure 1:
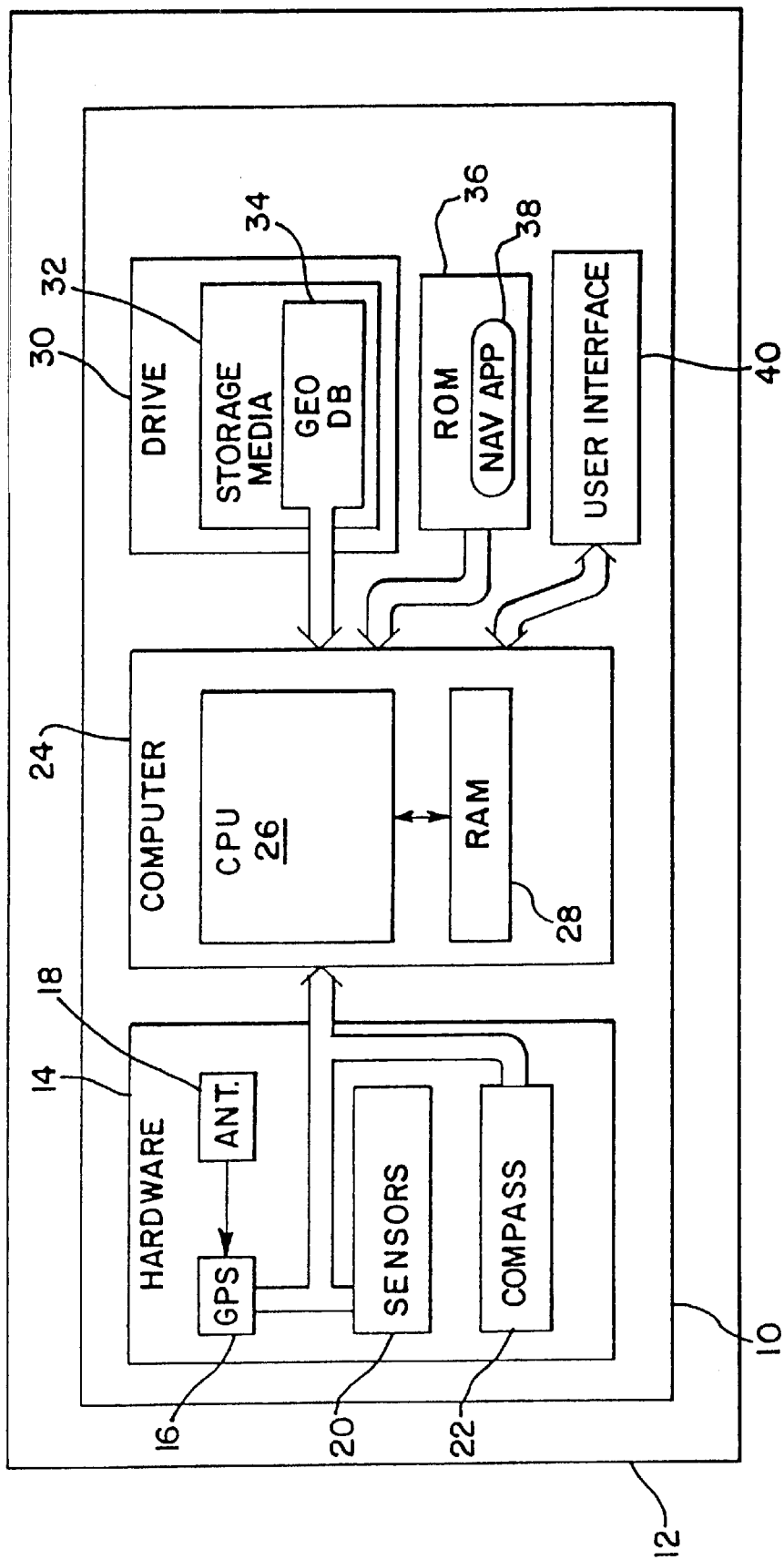
FIG. 1 is a block diagram showing major components of an exemplary navigation system used in conjunction with a first embodiment of the present invention.

Referring to FIG. 1, there is a diagram illustrating an exemplary configuration of a navigation system 10. The navigation system 10 is a combination of hardware and software components. In one embodiment, the navigation system 10 is located in an automobile 12. The navigation system 10 includes appropriate hardware 14 which in an exemplary embodiment may include a GPS system 16, an antenna 18, sensors 20 coupled to sense the vehicle speed, and a compass 22 to sense the vehicle direction. In addition, the navigation system 10 includes an appropriate computer 24, including a CPU 26 and memory 28 as well as other appropriate hardware. Also included as part of the navigation system 10 is a drive 30 (or other suitable peripheral device) into which a medium 32 can be installed. One or more geographic data sets 34 are stored on the medium 32. Further, the navigation system 10 may include another storage device 36 (or ROM) which is used to store a navigation application program 38. Alternatively, the geographic data sets 34 and the application program 38 may be provided on a single storage device or medium. The navigation system 10 also includes a user interface 40 coupled to the computer 24. The user interface 40 includes appropriate means for receiving instructions and input from a user as well as means for providing information back to the user. For example, the user interface 40 may include an input panel or keyboard into which a user may indicate a selection of a destination. The user interface 40 may also include a display or speakers (including speech synthesis hardware and software) by which the user can be informed of navigation information.

All of the components described above may be conventional (or other than conventional) and the manufacture and use of these components are known to those of skill in the art. For example, the processor 26 may be of any type used in navigation systems, such as 32-bit processors using a flat address space, such as a Hitachi SH1, an Intel 80386, an Intel 960, a Motorola 68020 (or other processors having similar or greater addressing space). Processor types other than these, as well as processors that may be developed in the future, are also suitable. In one embodiment, the storage medium 32 is a CD-ROM. In another alternative embodiment, the storage medium 32 may be a PCMCIA card in which case the drive 30 would be substituted with a PCMCIA slot. Various other storage media may be used, including fixed or hard disks, DVD (digital video disks) or other currently available storage media, as well as storage media that may be developed in the future. The embodiments disclosed herein may be used in other types of navigation systems, as explained below.

The geographic data 34 may be in the form of one or more computer-readable data files or databases. The geographic data 34 may include information about the positions of roads and intersections in or related to a specific geographic region or area, and may also include information about one-way streets, turn restrictions, street addresses, alternative routes, hotels, restaurants, museums, stadiums, offices, automobile dealerships, auto repair shops, etc. The geographic data 34 may take a variety of different forms. For purposes of this disclosure, it is understood that the geographic data 34 include data entities corresponding to "segments" and "nodes." A "segment" is a data entity that represents a portion of a navigable roadway in the geographic region and a "node" is a data entity that represents a point in the geographic region. A "segment" has two "nodes" associated with it, one at each end. In one embodiment, the geographic data are provided by Navigation Technologies of Sunnyvale, Calif., however it is understood that data developed and provided by other entities may also be suitable for use with the inventive subject matter disclosed herein.

II. The Navigation Application Program

The navigation application software program 38 may include separate applications (or subprograms). These subprograms provide various navigation features to the user of the navigation system 10. These features may include route calculation functions, maneuver generation functions, map display functions, vehicle positioning functions, destination resolution capabilities, and so on. The navigation application program may be written in a suitable computer programming language such as C.

During a typical use of the navigation system 10 of FIG. 1, the navigation application program 38 is loaded from the ROM 36 into the memory 28 associated with the processor 26. The computer 24 receives input from the user interface 40. The input may include a request for navigation information. The computer 24 may request and receive information from the hardware 14 indicating a position of the vehicle 12. The information from the hardware 14 may be used by the navigation application software 38 that is run on the processor 26 to determine the location, direction, speed, etc., of the navigation system 10. The navigation system 10 uses the geographic data 34 stored on the storage medium 32, possibly in conjunction with the output from the hardware 14, to provide various navigation application features. These navigation application features may include route calculation, map display, vehicle positioning (e.g. map matching), maneuver generation (wherein detailed directions are provided for reaching a desired destination), and other features. These navigation application features are provided by the navigation application subprograms or functions that are part of the navigation application software program 38. The navigation features are provided to the user (e.g., the vehicle driver) by means of the user interface 40.

Figure 2:
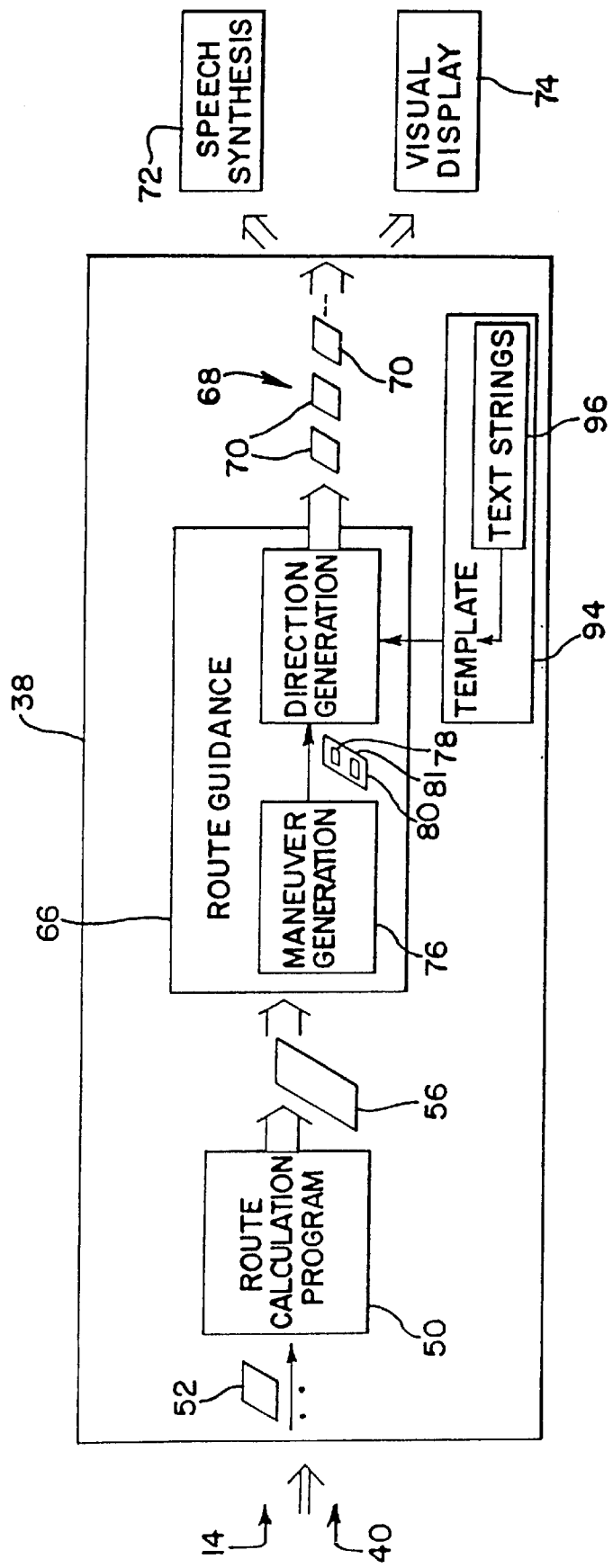
FIG. 2 is a block diagram showing a portion of the navigation application program in FIG. 1.

FIG. 2 is block diagram representing a portion of the navigation application program 38. The portion of the navigation application program 38 in FIG. 2 includes the portion that calculates a route from a source location to a destination location and a portion that provides maneuvering directions relating to the calculated route to the user. In FIG. 2, a route calculation program 50 receives input parameters 52. The input parameters 52 are derived from one or more of the inputs to the computer 24 from the hardware 14 and user interface 40 (represented in FIG. 1).

The route calculation program 50 provides an output 56. FIG. 3 is a diagram representing the output 56 of the route calculation program and FIG. 4 is a map diagram illustrating a portion of the geographic area 59 to which the geographic data 34 relate. Referring to FIG. 3, the output 56 of the route calculation program 50 is in the form of a list 58 of contiguous segments representing the route calculated by the route calculation program 50 from a source 60 located at a position in the geographic area to a destination 62 located at another position in the geographic area. The map of FIG. 4 is overlaid with representations of several segment data entities at positions corresponding to the positions of the portions of roadways in the geographic area to which the segment data entities correspond. The map of FIG. 4 is also overlaid with representations of several node data entities at positions corresponding to the positions of the points in the geographic area to which they correspond. FIG. 4 also includes an illustration of the location of the source 60 and the destination 62 in the geographic area. Referring to FIG. 3, the list 58 in the output 56 represents the route calculated by the route calculation program 50 from the source 60 located at a position in the geographic area 59 corresponding to the location of the node N1 to the destination 62 located at a position in the geographic area 59 corresponding to the location of the node N15. (The way in which the route calculation program 50 calculates a route is not part of the present invention. Any suitable route calculation program now known by those of ordinary skill in the art or hereafter developed may be used.)

The list 58 of segments in FIG. 3 includes the segments, S1, S2 . . . S14, from the source 60 to the destination 62. These segments are logical entities and may bear no relationship to what the user sees in the geographic area. Note that each segment has two nodes associated with it. Since these segments form a contiguous route, each segment shares a node with its successor segment in the list. For example, segment S1 includes two nodes, N1 and N2, and its successor segment S2 includes two nodes, N2 and N3, one of which (i.e. N2) is shared with the segment S1, and so on.

III. The Maneuver Generation Program

Referring again to FIG. 2, the route calculation program 50 provides the output 56 to a route guidance program 66. The route guidance program 66 generates an output 68. The output 68 is comprised of a series of maneuvers 70 which the route guidance program 66 derives from the list 58 of segments included in the output 56 of the route calculation program 50. The output 68 of the route guidance program 66 is provided to appropriate means for conveying the information to the user. These information conveying means may include a speech synthesis program 72 and/or a visual display program 74. The speech synthesis program 72 generates an output that can be provided to appropriate hardware so that the user can hear the series of maneuvers 70 and the visual display program 74 generates an output to appropriate hardware so that the user can view the series of maneuvers 70 on a suitable display.

Referring to FIGS. 2 and 3, the route guidance program 66 is comprised of two subprograms: a maneuver generation program 76 and a direction generation program 78. The maneuver generation program 76 examines the nodes in the list 58 of segments output from the route calculation program 50 and produces a list 80 of maneuver descriptions 81 that correspond to the route represented by the list 58 of segments. These maneuver descriptions 81 contain all the information necessary to describe the maneuvers in a clear and unambiguous manner. (A C data structure is defined to contain the information included in the maneuver descriptions 81. The format of the C data structure defined for the maneuver descriptions 81 is described below.) The direction generation program 78 takes the list 80 of maneuver descriptions 81 and produces the output 68 of maneuvers 70. Using the list 80 of maneuver descriptions 81, the direction generation program 78 develops a description of each of the maneuvers in a definable format and outputs these descriptions as the series of maneuvers 70. The description of each maneuver may be a text description (e.g. a text string) or other type of description.

As mentioned above, the maneuver generation program 76 examines the nodes in the list 58 of segments from the route calculation program 50 to generate the list 80 of maneuvers 81. Maneuvers may occur when going from one segment to another, i.e. at the node that is common between two segments. However, it will not always be necessary to have a maneuver at a node. For example, if all the end-user has to do is remain straight on course, it may be preferable and less confusing not to provide a maneuver. If there are K segments between a source and destination, then there are K+1 nodes. Typically, there will be fewer than K+1 maneuvers.

Referring again to the example in FIG. 4, the maneuver generation program 76 has generated twelve maneuvers. These maneuvers are labeled M1–M12 and superimposed on the map of FIG. 4 adjacent to the nodes to which they correspond. Maneuver M1 is a starting-off maneuver describing the general direction to be taken to begin the route. Likewise, M12 is the maneuver associated with the destination. The maneuvers in between describe the course alterations to be made, i.e. right or left turns, etc. In FIG. 4, no maneuver is required to go from S3 to S4 or from S9 to S10. Maneuvers are generated for all other nodes on the route.

When generating maneuvers, the maneuver generation program 76 examines each of the nodes in the list 58 of segments, one node at a time, for a potential maneuver. A finite list of possible maneuver types is considered, and if a node in the list 58 fails to meet the criteria for each of these maneuver types, no maneuver is generated for that node.

The maneuver type is a classification of the maneuver from a limited set of possibilities. It is considered desirable that the maneuver generation program generate consistent maneuvers. For example, it is considered desirable that the maneuver generation program generate the sa,me maneuvers for a given route or even portions of a route. Further, it is desirable that the maneuver generation program provide the same type of maneuver instructions for different intersections that have similar geometry and characteristics. Accordingly, for each of the possible maneuver types, there is a series of associated tests that can be applied to the node, and more specifically to the road segments meeting at the node. In a preferred embodiment, the series of tests uniquely define each maneuver type. In a more preferred embodiment, a maneuver of a particular type is considered to occur at a node if the node (including the segments that meet at the node) passes all the tests associated with the maneuver type. As soon as a maneuver type is determined for a node, no further tests need to be done for that node.

In an alternative embodiment, a series of tests may be used that define maneuver types wherein passing all the tests for one of the maneuver types does not uniquely define the one of the maneuver types from the other maneuver types. However, in this alternative embodiment, the order in which the tests are conducted becomes important to determine the correct maneuver type. The approach used in the preferred embodiment of the maneuver generation program 76 avoids this requirement.

The following 56 tests may be used by the maneuver generation program 76. These tests are used both to determine whether a maneuver is to be generated for a particular node and also to determine what type of maneuver characterizes the node if a maneuver is to be generated. These 56 tests form a superset of tests from which unique subsets of tests are selected for each different maneuver type. These 56 tests may include some tests which are not used in an initial or default release of the maneuver generation program., but are provided to be available for future use or for use in customized versions of the maneuver generation program. For purposes of the explanation herein, the tests are organized into groups which relate to the aspect of the node subject to testing.

(For purposes of the tests set forth below, certain terminology is used and is considered to have the following meanings. A "rank" of a segment specifies the highest data layer in which a segment exists and may also correspond to a functional class of the segment. (For example, a four lane road has a higher rank than a two lane road.) The "name" of a segment refers to the street or highway name by which the roadway to which the segment corresponds is known. A "roundabout" is a intersection at which two or more roads meet at an accessible roadway loop that connects all the roads and from which exit is by way of traveling the roadway loop upon which traffic moves in only one direction. An "accessible" segment at a given node is a segment -other than the entry or exit segment- that has one of its nodes corresponding to the given node and into which entry from the entry segment is not prohibited. An "inaccessible" segment at a given node is a segment other than the entry or exit segment- that has one of its nodes corresponding to the given node and into which entry from the entry segment is prohibited. A "controlled access" segment represents a roadway which is accessed from a ramp. It is understood that the terminology and meanings relate to a particular embodiment and should not be construed as limiting. Other embodiments may use different terminology or meanings for similar or related concepts.)

The tests for determining a unique maneuver type are as follows:

A. Tests Relating to the Turn Angle:

1. Is there a fork at the node?

Figure 5A:
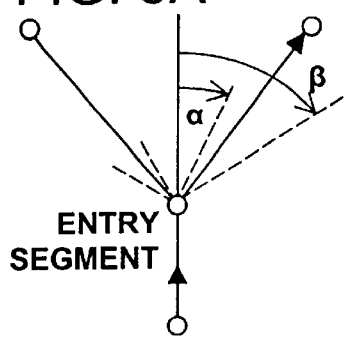
FIG. 5A is a diagram of a map illustrating one of the tests applied by the maneuver generation program of FIG. 2.

This test returns positive if the road segments meeting at the node have the geometry of a fork. The geometry of a fork is represented in FIG. 5A. For a road geometry to be considered a fork, it is required that there be just one other accessible segment in addition to the entry and exit segments. Referring to FIG. 5A, the right arm of the fork lies between $\alpha$ and $\beta$ and the left arm between $360°-\alpha$ and $360°-\beta$. $\alpha$ and $\beta$ are configurable parameters chosen to match typical centerline digitized forks in the geographic database. In one embodiment, the fork angle $\alpha$ is 1° and the fork angle $\beta$ is 35°.

2. Is there not a fork at the node?

This test returns positive if the road segments meeting at the node do not have the geometry of a fork.

3. Is there a merge at the node?

Figure 5B:
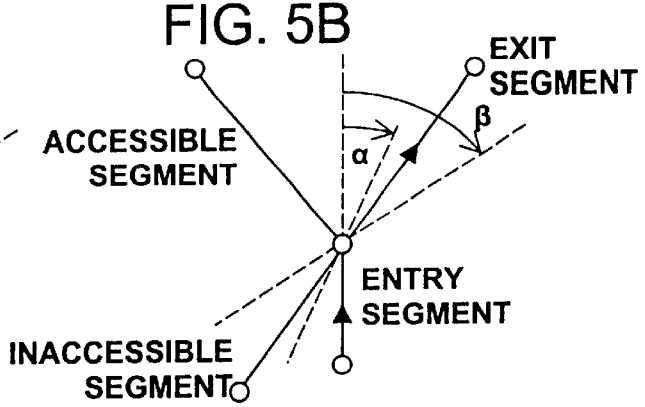
FIG. 5B is a diagram of a map illustrating another of the tests applied by the maneuver generation program of FIG. 2.

This test returns positive if the road segments meeting at the node have the geometry of a merge. The geometry of a merge is represented in FIG. 5B. For a road geometry to be considered a merge, it is required that there be just one other inaccessible segment in addition to the entry and exit segments. The exit segment lies between $\alpha$ and $\beta$ and the inaccessible segment between $\alpha+180°$ and $\beta+180°$. $\alpha$ and $\beta$ are configurable parameters chosen to match typical centerline digitized merges in the database. In one embodiment, the merge angle $\alpha$ is 0° and the merge angle $\beta$ is 45°.

4. Is there not a merge at the node?

This test returns positive if the road segments meeting at the node do not have the geometry of a merge.

5. Is there a U-turn at the node?

This test returns positive if the road segments meeting at the node have the geometry of a U-turn. In one embodiment, a U-turn angle $\alpha$ is 146° and the U-turn angle $\beta$ is 213°.

6. Is there not a U-turn at the node?

This test returns positive if the road segments meeting at the node do not have the geometry of a U-turn.

7. Is there a significant angle at the node?

Figure 5C:
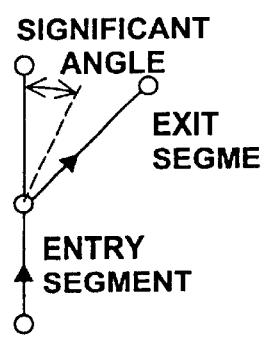
FIG. 5C is a diagram of a map illustrating still another of the tests applied by the maneuver generation program of FIG. 2.

This test returns positive if the turn angle is significant, i.e. a significant change of heading is required to go from the entry segment to the exit segment. The geometry of a significant angle is represented in FIG. 5C. The magnitude of angle that constitutes a significant angle is a user definable parameter. If the exit segment angle is greater than the significant angle (or less than 360°- the significant angle), a significant angle exists at the node. In one embodiment, the significant angle is 23°.

8. Is there not a significant angle at the node?

This test returns positive if the turn angle is not significant, i.e., no significant change in heading is required to go from the entry segment to the exit segment.

9. Are there one or more accessible or inaccessible segments at the node?

This test returns positive if the sum of accessible and inaccessible segments is one or greater.

B. Tests Relating to the Entry Segment:

10. Is the entry segment classified as a street?

This test returns positive if the entry segment is classified as a street.

11. Is the entry segment classified as a ramp?

This test returns positive if the entry segment is classified as a ramp.

12. Is the entry segment classified as controlled access?

This test returns positive if the entry segment is classified as a controlled access.

13. Is the entry segment classified as a roundabout?

This test returns positive if the entry segment is classified as a roundabout.

14. Is the entry segment not classified as a roundabout?

This test returns positive if the entry segment is not classified as a roundabout.

15. Is the entry segment classified as a boat ferry?

This test returns positive if the entry segment is classified as a boat ferry.

16. Is the entry segment not classified as a boat ferry?

This test returns positive if the entry segment is not classified as a boat ferry.

17. Is the entry segment classified as a rail ferry?

This test returns positive if the entry segment is classified as a rail ferry.

18. Is the entry segment not classified as a rail ferry?

This test returns positive if the entry segment is not classified as a rail ferry.

19. Is the entry segment classified as a bridge?

This test returns positive if the entry segment is classified as a bridge.

20. Is the entry segment not classified as a bridge?
This test returns positive if the entry segment is not classified as a bridge.

21. Is the entry segment classified as a tunnel?
This test returns positive if the entry segment is classified as a tunnel.

22. Is the entry segment not classified as a tunnel?
This test returns positive if the entry segment is not classified as a tunnel.

23. Is the entry segment classified as a toll?
This test returns positive if the entry segment is classified as a toll road.

24. Is the entry segment not classified as a toll?
This test returns positive if the entry segment is not classified as a toll road.

C. Tests Relating to the Exit Segment:

25. Is the exit segment classified as a street?
This test returns positive if the exit segment is classified as a street.

26. Is the exit segment classified as a ramp?
This test returns positive if the exit segment is classified as a ramp.

27. Is the exit segment classified as controlled access?
This test returns positive if the exit segment is classified as a controlled access.

28. Is the exit segment classified as a roundabout?
This test returns positive if the exit segment is classified as a roundabout.

29. Is the exit segment not classified as a roundabout?
This test returns positive if the exit segment is not classified as a roundabout.

30. Is the exit segment classified as a boat ferry?
This test returns positive if the exit segment is classified as a boat ferry 31. Is the exit segment not classified as a boat ferry?
This test returns positive if the exit segment is not classified as a boat ferry.

32. Is the exit segment classified as a rail ferry?
This test returns positive if the exit segment is classified as a rail ferry.

33. Is the exit segment not classified as a rail ferry?
This test returns positive if the exit segment is not classified as a rail ferry.

34. Is the exit segment classified as a bridge?
This test returns positive if the exit segment is classified as a bridge.

35. Is the exit segment not classified as a bridge?
This test returns positive if the exit segment is not classified as a bridge.

36. Is the exit segment classified as a tunnel?
This test returns positive if the exit segment is classified as a tunnel.

37. Is the exit segment not classified as a tunnel?
This test returns positive if the exit segment is not classified as a tunnel.

38. Is the exit segment classified as a toll road?
This test returns positive if the exit segment is classified as a toll road.

39. Is the exit segment not classified as a toll road?
This test returns positive if the exit segment is not classified as a toll road.

40. Does the exit segment have the same name as the entry segment?
This test returns positive if the exit segment has the same name as the entry segment.

41. Does the exit segment have a different name than the entry segment?
This test returns positive if the exit and entry segments have different names.

42. Is the rank of the exit segment less than the rank of the entry segment?
This test returns positive if the rank of the exit segment is less than the rank of the entry segment.

43. Is the rank of the exit segment greater than or equal to the rank of the entry segment?
This test returns positive if the rank of the exit segment is greater than or equal to the rank of the entry segment.

44. Is the exit segment on the right of the entry segment?
This test returns positive if the exit segment is on the right of the entry segment.

45. Is the exit segment on the left of the entry segment?
This test returns positive if the exit segment is on the left of the entry segment.

D. Tests Relating to the Accessible Segment(s) other than the Exit Segment:

46. Are there no segments accessible from the entry segment?
This test returns positive if there are no segments (other than the exit segment) accessible from the entry segment.

47. Is there only one segment accessible from the entry segment?
This test returns positive if there is only one segment (other than the exit segment) accessible from the entry segment.

48. Is there one or more segments accessible from the entry segment?
This test returns positive if there is at least one segment (in addition to the exit segment) accessible from the entry segment.

49. Are there no segments accessible from the entry segment with the same name as the entry segment?
This test returns positive if no accessible segment has the same name as the entry segment.

50. Are there one or more segments accessible from the entry segment with the same name as the entry segment?
This test returns positive if at least one accessible segment has the same name as the entry segment.

51. Is there one or more accessible segments classified as a street?
This test returns positive if at least one accessible segment is classified as a street.

52. Is there one or more accessible segments classified as a ramp?
This test returns positive if at least one accessible segment is classified as a ramp.

53. Is there one or more accessible segments classified as a controlled access?
This test returns positive if at least one accessible segment is classified as a controlled access.

E. Tests Relating to Inaccessible Segment(s):

54. Are there no inaccessible segments from the entry segment?
This test returns positive if there are no inaccessible segments.

55. Is there one or more inaccessible segments from the entry segment?
This test returns positive if there is at least one inaccessible segment.

56. Are there any inaccessible segments from the entry segment with the same name as the exit segment?
This test returns positive if there are any inaccessible segments having the same name as the exit segment. (This test is used mainly when testing for merges.)

Using these tests, the maneuver generation program 76 can uniquely determine one maneuver type from a collection of maneuver types. This collection of maneuver types substantially encompasses many, if not most or all, types of maneuvers that a user will encounter. For each maneuver type, a set of some of the tests is used. If the node under examination by the maneuver generation program 76 passes all the tests associated with a particular maneuver type, then a maneuver of that particular maneuver type is assigned to that node. If the node under examination does not pass all the tests associated with a particular maneuver type, then the maneuver generation program 76 examines the node with the tests of another maneuver type. Since the tests of each maneuver type are unique from each other, a maneuver of one particular maneuver type can be assigned to the node as soon as the node passes all the tests associated with that particular maneuver type. The maneuver generation program 76 does not have to perform any additional tests on the segments associated with the node since only one maneuver type will be defined by a particular set of positive test results.

As mentioned above, not all the 56 tests have to be used in defining maneuver types. Some of the tests may be available for use in future or customer versions of the program. Having tests which are not used in any of the defined maneuver types, does not result in any performance burden since the maneuver generation program does not execute such tests. When the maneuver generation program executes the tests upon data corresponding to a location, it runs through all the tests until either a maneuver type is defined (by the successful return of positive results to all the tests used to define the particular maneuver type), or until all the defined maneuver types are eliminated (by the failure of at least one test in each of the defined maneuver types). Thus, if a test is available but not used in any of the maneuver types, it does not run because at each location either one of the maneuver types is defined or all the maneuver types are eliminated.

In one embodiment of the maneuver generation program 76, the following 49 maneuver types are defined. Associated with each of the maneuver types are the tests for which a positive result is required to be returned in order for that maneuver type to be found.

1. Stay straight to remain on street A.

Figures 1, 6A:
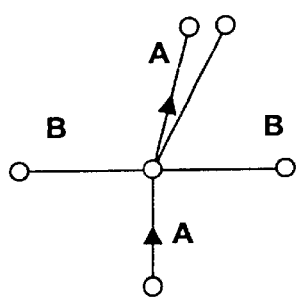
Figures 2, 6A:
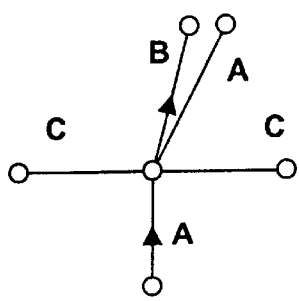
Figures 3, 6A:
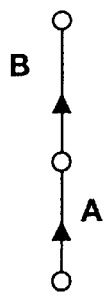
Figures 4, 6A:
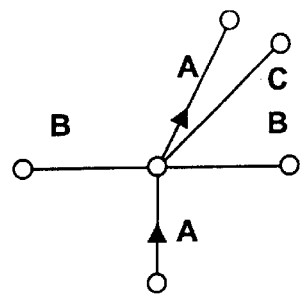

This type of maneuver is represented in FIG. 6A-1 and is determined by positive results to the following tests:

There is not a significant angle.
 The entry segment is a street.
 The entry segment is not a roundabout.
 The exit segment is a street.
 The exit segment is not a roundabout.
 The exit segment has the same name as the entry segment.

2. Stay straight to go onto street B.

This type of maneuver is represented in FIG. 6A-1 and is determined by positive results to the following tests:

There is not a significant angle.
 The entry segment is a street.
 The entry segment is not a roundabout.
 The exit segment is a street.
 The exit segment is not a roundabout.
 The exit segment has a different name than the entry segment.

3. Street A becomes street B.

This type of maneuver is represented in FIG. 6A-3 and is determined by positive results to the following tests:

The entry segment is a street.
 The entry segment is not a roundabout.
 The exit segment is a street.
 The exit segment is not a roundabout.
 The exit segment has a different name than the entry segment.
 There are no accessible segments.

4. Turn to stay on street A.

This type of maneuver is represented in FIG. 6A-4 and is determined by positive results to the following tests:

The node does not have the geometry of a U-turn.
 The turn angle is significant
 The entry segment is a street.
 The entry segment is not a roundabout.
 The exit segment is a street.
 The exit segment is not a roundabout.
 The exit segment has the same name as the entry segment.
 There is at least one accessible segment classified as a street.

5. Turn onto street B.

Figures 5, 6A:
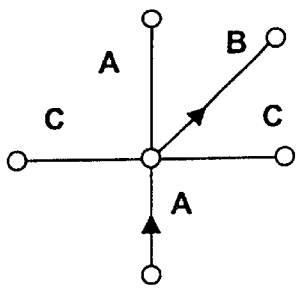

This type of maneuver is represented in FIG. 6A-5 and is determined by positive results to the following tests:

The node does not have the geometry of a U-turn.
 The turn angle is significant.
 There is at least one accessible segment or one inaccessible segment.
 The entry segment is a street.
 The entry segment is not a roundabout.
 The exit segment is a street.
 The exit segment is not a roundabout.
 The exit segment has a different name than the entry segment.

6. Branch (fork) to stay on street A.

Figures 6, 6A:
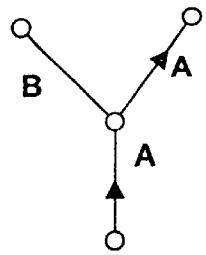

This type of maneuver is represented in FIG. 6A-6 and is determined by positive results to the following tests:

The geometry of the node is within limits of a fork.
 The entry segment is a street.
 The entry segment is not a roundabout.
 The exit segment is a street.
 The exit segment is not a roundabout.
 The exit segment has the same name as the entry segment.
 There is only one accessible segment.
 There is at least one accessible segment classified as a street.
 There are no inaccessible segments.

7. Branch (fork) onto street B.

Figures 6, 6A, 7:
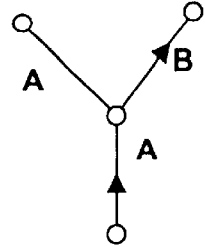

This type of maneuver is represented in FIG. 6A-7 and is determined by positive results to the following tests:

The geometry of the node is within limits of a fork.
 The entry segment is a street.
 The entry segment is not a roundabout.
 The exit segment is a street.
 The exit segment is not a roundabout.
 The exit segment has a different name than the entry segment.
 There is only one accessible segment.
 There is at least one accessible segment classified as a street.
 There are no inaccessible segments.

8. Street A merges onto Street B.

This type of maneuver is represented in FIG. 6A-8 and is determined by positive results to the following tests:

The geometry of the node is within limits of a merge.

The entry segment is a street.

The entry segment is not a roundabout.

The exit segment is a street.

The exit segment is not a roundabout.

The exit segment has a different name than the entry segment.

There are no accessible segments.

There is at least one inaccessible segment.

The inaccessible segment has the same name as the exit segment.

9. U-turn on street A.

This type of maneuver is represented in FIG. 6A-9 and is determined by positive results to the following tests:

The geometry of the node is that of a U-turn.

The entry segment is a street.

The exit segment is a street.

The exit segment has the same name as the entry segment.

10. Stay straight to remain on ramp A (from a ramp).

This type of maneuver is represented in FIG. 6A-10 and is determined by positive results to the following tests:

The geometry of the node is not a fork.

There is not a significant angle.

The entry segment is a ramp.

The exit segment is a ramp.

The exit segment has the same name as the entry segment.

There is at least one accessible segment.

11. Stay straight to go onto ramp B (from a ramp).

This type of maneuver is represented in FIG. 6A-11 and is determined by positive results to the following tests:

The geometry of the node is not a fork.

There is not a significant angle.

The entry segment is a ramp.

The exit segment is a ramp.

The exit segment has a different name than the entry segment.

There is at least one accessible segment.

12. Ramp A becomes ramp B.

This type of maneuver is represented in FIG. 6A-12 and is determined by positive results to the following tests:

The entry segment is a ramp.

The exit segment is a ramp.

The exit segment has a different name than the entry segment.

There are no accessible segments.

13. Turn to stay on ramp A.

This type of maneuver is represented in FIG. 6A-13 and is determined by positive results to the following tests:

The geometry of the node is not a fork.

The turn angle is significant.

The entry segment is a ramp.

The exit segment is a ramp.

The exit segment has the same name as the entry segment.

There is at least one accessible segment.

14. Turn to go onto ramp B (from a ramp).

This type of maneuver is represented in FIG. 6A-14 and is determined by positive results to the following tests:

The geometry of the node is not a fork.

The turn angle is significant.

The entry segment is a ramp.

The exit segment is a ramp.

The exit segment has a different name than the entry segment.

There is at least one accessible segment.

15. Branch (fork) to stay on ramp A.

This type of maneuver is represented in FIG. 6A-15 and is determined by positive results to the following tests:

The geometry of the node is within limits of a fork.

The entry segment is a ramp.

The exit segment is a ramp.

The exit segment has the same name as the entry segment.

There is only one accessible segment.

There is at least one accessible segment classified as a ramp.

There are no inaccessible segments.

16. Branch (fork) onto ramp B.

This type of maneuver is represented in FIG. 6A-16 and is determined by positive results to the following tests:

The geometry of the node is within limits of a fork.

The entry segment is a ramp.

The exit segment is a ramp.

The exit segment has a different name than the entry segment.

There is only one accessible segment.

There is at least one accessible segment classified as a ramp.

There are no inaccessible segments.

17. Ramp A merges onto ramp B.

This type of maneuver is represented in FIG. 6A-17 and is determined by positive results to the following tests:

The geometry of the node is within limits for a merge.

The entry segment is a ramp.

The exit segment is a ramp.

The exit segment has a different name than the entry segment.

There are no accessible segments.

There is at least one inaccessible segment.

The inaccessible segment has the same name as the exit segment.

18. Stay straight to remain on controlled access A.

This type of maneuver is represented in FIG. 6A-18 and is determined by positive results to the following tests:

There is not a significant angle.

The entry segment is controlled access.

The exit segment is controlled access.

The exit segment has the same name as the entry segment.

There are no accessible segments.

19. Stay straight to remain on controlled access A (at the junction of several controlled access roads).

This type of maneuver is represented in FIG. 6A-19 and is determined by positive results to the following tests:

There is not a significant angle.

The entry segment is controlled access.

The exit segment is controlled access.

The exit segment has the same name as the entry segment.

There is at least one accessible segment.

There is at least one accessible segment classified as controlled access.

20. Stay straight to go onto controlled access B (from a controlled access).

This type of maneuver is represented in FIG. 6A-20 and is determined by positive results to the following tests:

There is not a significant angle.
The entry segment is controlled access.
The exit segment is controlled access.
The exit segment has a different name than the entry segment.
There is at least one accessible segment.

21. Controlled access A becomes controlled access B.
This type of maneuver is represented in FIG. 6A-21 and is determined by positive results to the following tests:
The entry segment is controlled access.
The exit segment is controlled access.
The exit segment has a different name than the entry segment.
There are no accessible segments.
There are no inaccessible segments.

22. Turn to stay on controlled access A.
This type of maneuver is represented in FIG. 6A-22 and is determined by positive results to the following tests:
The geometry of the node is not within limits of a fork.
The turn angle is significant.
The entry segment is controlled access.
The exit segment is controlled access.
The exit segment has the same name as the entry segment.
There is at least one accessible segment.

23. Turn to go onto controlled access B (from a controlled access).
This type of maneuver is represented in FIG. 6A-23 and is determined by positive results to the following tests:
The geometry of the node is not within limits of a fork.
The turn angle is significant.
The entry segment is controlled access.
The exit segment is controlled access.
The exit segment has a different name than the entry segment.
There is at least one accessible segment.

24. Branch (fork) to stay on controlled access A.
This type of maneuver is represented in FIG. 6A-24 and is determined by positive results to the following tests:
The geometry of the node is within limits of a fork.
The entry segment is controlled access.
The exit segment is controlled access.
The exit segment has the same name as the entry segment.
There is only one accessible segment.
There is at least one accessible segment classified as controlled access.
There are no inaccessible segments.

25. Branch (fork) onto controlled access B.
This type of maneuver is represented in FIG. 6A-25 and is determined by positive results to the following tests:
The geometry of the node is within limits of a fork.
The entry segment is controlled access.
The exit segment is controlled access.
The exit segment has a different name than the entry segment.
There is only one accessible segment.
There is at least one accessible segment classified as controlled access.
There are no inaccessible segments.

26. Controlled access A merges onto controlled access B.
This type of maneuver is represented in FIG. 6A-26 and is determined by positive results to the following tests:
The geometry of the node is within limits of a merge.
The entry segment is controlled access.
The exit segment is controlled access.
The exit segment has a different name than the entry segment.
There are no accessible segments.
There is at least one inaccessible segment.
The inaccessible segment has the same name as the exit segment.

27. Ramp A becomes street B.
This type of maneuver is represented in FIG. 6A-27 and is determined by positive results to the following tests:
The entry segment is a ramp.
The exit segment is a street.
There are no accessible segments.

28. Stay straight to go onto street B (from a ramp).
This type of maneuver is represent ed in FIG. 6A-28 and is determined by positive results to the following tests:
There is not a significant angle.
The entry segment is a ramp.
The exit segment is a street.
There is at least one accessible segment.

29. Turn onto street B (from a ramp).
This type of maneuver is represented in FIG. 6A-29 and is determined by positive results to the following tests:
The turn a angle is significant.
The entry segment is a ramp.
The exit segment is a street.
There is at least one accessible segment.

30. Ramp A merges onto street B.
This type of maneuver is represented in FIG. 6A-30 and is determined by positive results to the following tests:
The geometry of the node is within limits for a merge.
The entry segment is a ramp.
The exit segment is a street.
There are no accessible segments.
There is at least one inaccessible segment.
The in accessible segment has the same name as the exit segment.

31. Street A becomes ramp B.
This type of maneuver is represented in FIG. 6A-31 and is determined by positive results to the following tests:
The entry segment is a street.
The exit segment is a ramp.
There are no accessible segments.

32. Controlled access A becomes ramp B.
This type of maneuver is represented in FIG. 6A-32 and is determined by positive results to the following tests:
The entry segment is a controlled access.
The exit segment is a ramp.
There are no accessible segments.

33. Stay straight to go onto ramp B (from a street).
This type of maneuver is represented in FIG. 6A-33 and is determined by positive results to the following tests:
There is not a significant angle.
The entry segment is a street.
The exit segment is a ramp.
There is at least one accessible segment.

34. Turn onto ramp B (from a street).
This type of maneuver is represented in FIG. 6A-34 and is determined by positive results to the following tests:

The turn angle is significant.
The entry segment is a street.
The exit segment is a ramp.
There is at least one accessible segment.
35. Exit controlled access on the right.
This type of maneuver is represented in FIG. 6A-35 and is determined by positive results to the following tests:
The entry segment is a controlled access.
The exit segment is a ramp.
The exit segment is on the right.
There is at least one accessible segment classified as controlled access.
36. Exit controlled access on the left.
This type of maneuver is represented in FIG. 6A-36 and is determined by positive results to the following tests:
The entry segment is a controlled access.
The exit segment is a ramp.
The exit segment is on the left.
There is at least one accessible segment classified as controlled access.
37. Ramp A becomes controlled access B.
This type of maneuver is represented in FIG. 6A-37 and is determined by positive results to the following tests:
The entry segment is a ramp.
The exit segment is a controlled access.
There are no accessible segments.
38. Stay straight to go onto controlled access B (from a ramp).
This type of maneuver is represented in FIG. 6A-38 and is determined by positive results to the following tests:
There is not a significant angle.
The entry segment is a ramp.
The exit segment is a controlled access.
There is at least one accessible segment.
39. Turn onto controlled access B (from a ramp).
This type of maneuver is represented in FIG. 6A-39 and is determined by positive results to the following tests:
The turn angle is significant.
The entry segment is a ramp.
The exit segment is a controlled access.
There is at least one accessible segment.
40. Ramp A merges onto controlled access B.
This type of maneuver is represented in FIG. 6A-40 and is determined by positive results to the following tests:
The geometry of the node is within limits for a merge.
The entry segment is a ramp.
The exit segment is a controlled access.
There are no accessible segments.
There is at least one inaccessible segment.
The inaccessible segment has the same name as the exit segment.
41. Entering a toll road.
This type of maneuver is determined by positive results to the following tests:
The entry segment is not a toll road.
The exit segment is a toll road.
42. Entering a tunnel.
This type of maneuver is determined by positive results to the following tests:
The entry segment is not a tunnel.
The exit segment is a tunnel.
43. Entering a bridge.
This type of maneuver is determined by positive results to the following tests:
The entry segment is not a bridge.
The exit segment is a bridge.
44. Entering a roundabout.
This type of maneuver is determined by positive results to the following tests:
The entry segment is not a roundabout.
The exit segment is a roundabout.
45. Exiting a roundabout.
This type of maneuver is determined by positive results to the following tests:
The entry segment is a roundabout.
The exit segment is not a roundabout.
46. Entering a boat ferry.
This type of maneuver is determined by positive results to the following tests:
The entry segment is not a boat ferry.
The exit segment is a boat ferry.
47. Exiting a boat ferry.
This type of maneuver is determined by positive results to the following tests:
The entry segment is a boat ferry.
The exit segment is not a boat ferry.
48. Entering a rail ferry.
This type of maneuver is determined by positive results to the following tests:
The entry segment is not a rail ferry.
The exit segment is a rail ferry.
49. Exiting a rail ferry.
This type of maneuver is determined by positive results to the following tests:
The entry segment is a rail ferry.
The exit segment is not a rail ferry.
Referring to FIGS. 7A, 7B, and 7C, there is a table 90 that associates the tests with each of the particular maneuver types. This table summarizes the description provided above. The left hand column of the table 90 provides a description of each of the 49 maneuver types and the top row of the table shows the 56 tests. To find the particular set of tests relevant to each maneuver type, refer to the row of cells associated with each maneuver type. An X in a cell indicates that a positive result to that particular test is required. The absence of an X indicates that a particular test is not used. In order to find a particular maneuver type, a positive result is required from all the tests identified by the X's in the row associated with the maneuver type.
Checking the Validity of the Tests
Referring to the table 90, it can be demonstrated that a given node will yield only one maneuver type. In the table 90, each row may be treated as a binary number, where an X is taken to be a "1" and the absence of an X is taken to be a "0."
For the "Branch (fork) to stay on street A" maneuver (maneuver type 6), the following number (A) is obtained (ignoring the output column):100000000 100010000000000 1100010000000000100000 01000100 100
For purposes of this example, consider another possible maneuver type defined yielding the following binary number (B): 100000000 100000000000000 10001000000000000100000 01000100 100
This latter maneuver type would yield a positive result any time the "Branch (fork) to stay on street A" maneuver yields a positive result for a given node because all the tests for the latter maneuver type are passed whenever the tests for the former maneuver type are passed. Accordingly, the new maneuver type would not be a valid type and would not be used. If all the "1's" of a given binary representation are found in the same positions of another binary representation, the order of the tests in the table becomes critical which is an undesirable situation. Using binary logic, it is possible to detect when this undesirable situation might occur and avoid it by prohibiting the defining of such maneuver types.

For example, A 100000000 100010000000000 100010000000000100000 01000100 100 AND B 100000000 100000000000000 100010000000000100000 01000100 100=C 100000000 100000000000000 100010000000000100000 01000100 100

If the result C of AND'ing any two rows of the table is equal to either A or B, there is a potential problem of non-uniqueness and the maneuver definitions can be redefined. As illustrated in the above example, the result C is equal to B, and therefore A and B do not define unique sets of tests. This test can be performed at initialization time and any problems identified and reported.

The Output Column

The last group of columns in the table 90 refers to how the maneuver type is treated if all its associated tests pass. There are three possibilities:

Return as a maneuver If all of the tests pass, return as a maneuver.

Return as advisory If all of the tests pass, return as an advisory.

Don't return Never return this maneuver/advisory type.

An "advisory" is generated at nodes where although no action is required, some useful information is available for the user. For example, the "Road A becomes Road B" maneuver type is strictly not a maneuver, since no action is required on the part of the user. This can be classified as an advisory. Advisories may be used by the navigation application to inform the user of changes to the environment as the route is being traversed. This context information can be reassuring to the user. Other examples include entering a tunnel, crossing a bridge, passing a point of interest, etc.

As mentioned above, the maneuver generation program 76 examines each node in the list 58 of segments output from the route calculation program 50 to determine which, if any, of the maneuver types characterizes the segments meeting at the node. A list 80 of maneuvers is sent to the direction generation program 78. The maneuver type, described above, is one of the members of the C data structure defined to provide the maneuver descriptions 81 that are output from the maneuver generation program 76 to the direction generation program 78.

Figures 6, 6A, 7, 8, 9, 10, 11, 12, 13, 14, 15, 16, 17, 18, 19, 20:
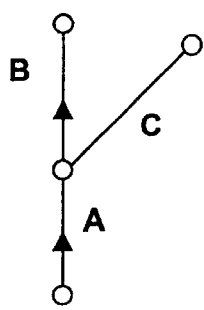
Figures 6, 6A, 7, 8, 9, 10, 11, 12, 13, 14, 15, 16, 17, 18, 19, 20, 21:
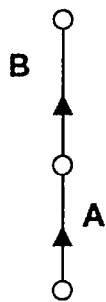
Figures 6, 6A, 7, 8, 9, 10, 11, 12, 13, 14, 15, 16, 17, 18, 19, 20, 21, 22:
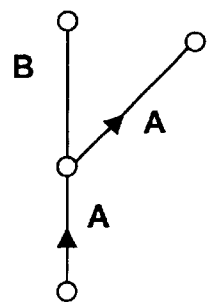
Figures 6, 6A, 7, 8, 9, 10, 11, 12, 13, 14, 15, 16, 17, 18, 19, 20, 21, 22, 23:
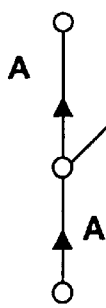
Figures 6, 6A, 7, 8, 9, 10, 11, 12, 13, 14, 15, 16, 17, 18, 19, 20, 21, 22, 23, 24:
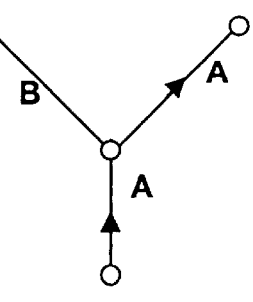
Figures 6, 6A, 7, 8, 9, 10, 11, 12, 13, 14, 15, 16, 17, 18, 19, 20, 21, 22, 23, 24, 25:
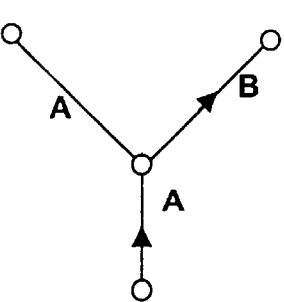
Figures 6, 6A, 7, 8, 9, 10, 11, 12, 13, 14, 15, 16, 17, 18, 19, 20, 21, 22, 23, 24, 25, 26:
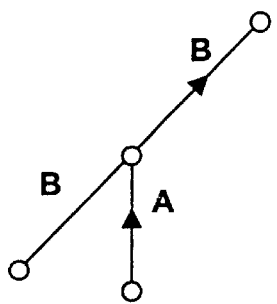
Figures 6, 6A, 7, 8, 9, 10, 11, 12, 13, 14, 15, 16, 17, 18, 19, 20, 21, 22, 23, 24, 25, 26, 27:
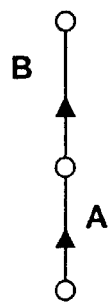
Figures 6, 6A, 7, 8, 9, 10, 11, 12, 13, 14, 15, 16, 17, 18, 19, 20, 21, 22, 23, 24, 25, 26, 27, 28:
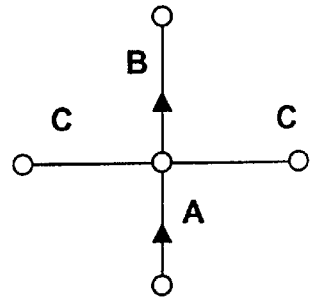
Figures 6, 6A, 7, 8, 9, 10, 11, 12, 13, 14, 15, 16, 17, 18, 19, 20, 21, 22, 23, 24, 25, 26, 27, 28, 29:
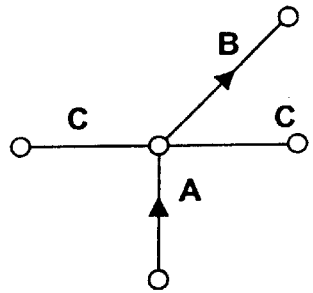
Figures 6, 6A, 7, 8, 9, 10, 11, 12, 13, 14, 15, 16, 17, 18, 19, 20, 21, 22, 23, 24, 25, 26, 27, 28, 29, 30:
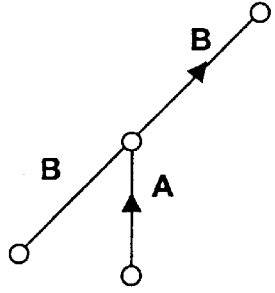
Figures 6, 6A, 7, 8, 9, 10, 11, 12, 13, 14, 15, 16, 17, 18, 19, 20, 21, 22, 23, 24, 25, 26, 27, 28, 29, 30, 31:
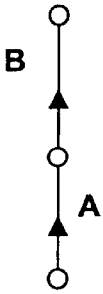
Figures 6, 6A, 7, 8, 9, 10, 11, 12, 13, 14, 15, 16, 17, 18, 19, 20, 21, 22, 23, 24, 25, 26, 27, 28, 29, 30, 31, 32:
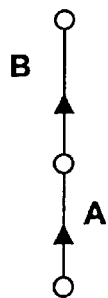
Figures 6, 6A, 7, 8, 9, 10, 11, 12, 13, 14, 15, 16, 17, 18, 19, 20, 21, 22, 23, 24, 25, 26, 27, 28, 29, 30, 31, 32, 33:
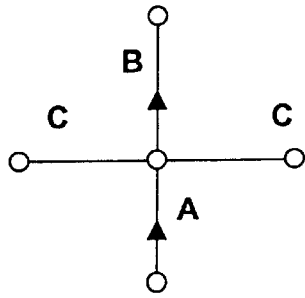
Figures 6, 6A, 7, 8, 9, 10, 11, 12, 13, 14, 15, 16, 17, 18, 19, 20, 21, 22, 23, 24, 25, 26, 27, 28, 29, 30, 31, 32, 33, 34:
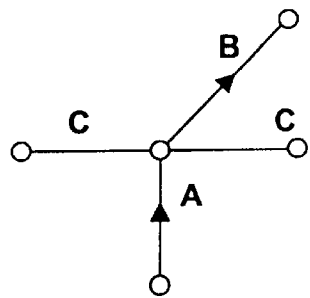
Figures 6, 6A, 7, 8, 9, 10, 11, 12, 13, 14, 15, 16, 17, 18, 19, 20, 21, 22, 23, 24, 25, 26, 27, 28, 29, 30, 31, 32, 33, 34, 35:
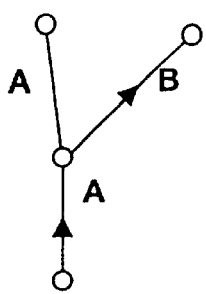
Figures 6, 6A, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36:
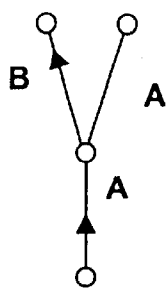
Figures 6, 6A, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37:
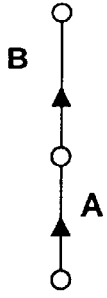
Figures 6, 6A, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38:
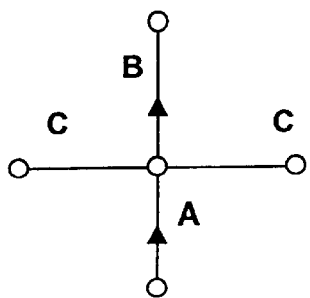
Figures 6, 6A, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39:
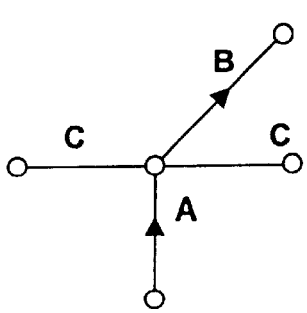
Figures 6, 6A, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40:
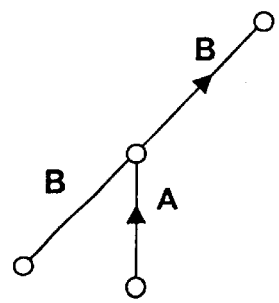

FIG. 8 is a diagram illustrating the members of the C data structure 84 defined to include the maneuvers 81 used in the list 80 produced as an output of the maneuver generation program 76. Each of the maneuvers 81 in the list 80 includes data corresponding to one or more of the members of the data structure illustrated in FIG. 8. At each location at which a maneuver type (or advisory) is generated, data are provided for the members of one or more of the C data structure members in FIG. 8. The data structure of FIG. 8 is defined to include information about the node that represents the location at which a maneuver is generated, information about the segments that meet at the node, and other information. Included in the information related to the node is a field that identifies the number of segments that meet at the node. The entry and exit segments are identified as well as any accessible segments and inaccessible segments. For each of the segments (entry, exit, accessible, and inaccessible), the data structure provides for identifying the segment database identification (a DBID), the name(s) of the segment (if any), sign(s) on the segment (if any), the "rank" of the segment, the segment classification relative to the entry segment (exit, accessible, inaccessible), the database classification of the segment (e.g. controlled access, street, ramp), the database sub-classification of the segment (bridge, tunnel, toll road, rail ferry, etc.), and the angle of the segment relative to the entry segment. In addition, the data structure for each maneuver also includes fields that can be used to identify whether the maneuver type is a maneuver or advisory, the maneuver type (as determined by the maneuver generation program, as described above), the turn angle, the distance to the next maneuver, and whether the maneuver is included in a multiple maneuver.

The data structure may also include fields for providing context information for the exit road. This kind of information may be useful when the other information in the maneuver structure is not sufficient to describe the exit fully, such as when the exit segment is unnamed. The fields for context information may include a destination string which describes the exit of the maneuver in cases where the exit segment name is not sufficient (such as when it is unnamed). The context information may also include a field for a "location" which gives the location of the exit relative to another road (e.g. before, after, ahead, behind, on the right, or on the left). The context information may also include a field for a "turn angle" which gives the angle to be taken to go onto the exit road. The context information may also include a field for a "heading" which can be used during the starting-off maneuver and provides the initial heading to be taken (e.g. north, south, east, west, northwest, etc.) The context information may also include a field for "relative to." The "relative to" field is meant to be used in a starting off maneuver. The "relative to" field gives an initial intersection to be traveled toward. It can also used in cases where the exit segment is unnamed (e.g. "turn right after Main Street"). The context information may also include a field for "number of exits" which can be used for roundabout maneuvers. This "number of exits" field includes the number of exits to be passed traveling along a roundabout before reaching the desired exit.

Data may be provided in the data structure for each of the above fields for each maneuver. However, for some maneuvers at some locations, there may be no information corresponding to some of these fields, and therefore, these fields may be left empty.

IV. The Direction Generation Program

The direction generation program 78 uses the maneuvers 81 in the list 80 in conjunction with a template 94 (FIG. 2). The template 94 may include text strings 96 or other lingual or contextual information to help render the maneuver information to the user. For example, the information from the list 80 can be associated with appropriate text strings 96 from the template 94 to provide the list 70 of maneuvers in a meaningful language format for the user. The template 94 may provide the text strings in a user-configurable language, for example, or alternatively may provide graphical or other means for information conveyance.

V. Multiple maneuvers

Often when traveling a route, two or more maneuvers have to be taken in close succession. It helps the user to be informed at one time of the entire sequence of such close maneuvers. Accordingly, as the list 80 of maneuvers 81 is being generated by the maneuver generation program 76, the distance from one individual maneuver to the next maneuver is also calculated. Maneuvers that are close together are marked so that the route guidance program 66 returns them as multiple maneuvers. How close maneuvers need to be to be regarded as part of multiple maneuvers is a configurable parameter. A default value of 100 meters may be provided for this parameter.

VI. Returning maneuvers incrementally

The route guidance program 66 may return the list of maneuvers 68 as a complete list or may return the maneuvers incrementally (e.g. one-by-one) as they are generated or needed. It may be preferable to return the maneuvers incrementally so that a user (e.g. a driver) can have the first few maneuvers as soon as they have been generated in order to set off on the route. The remaining maneuvers can be generated after the driver has begun traveling and will have been generated by the time that the driver is ready for them.

When returning maneuvers incrementally, the route guidance program 66 should account for any multiple maneuvers, as described above. Accordingly, even when returning maneuvers incrementally, the route guidance program 66 looks at two or more maneuvers at a time in order to assure that any maneuvers that are part of a group of multiple maneuvers are returned to the user together as a group. Hence, for a given maneuver, the next maneuver is generated. If the distance between the two maneuvers is greater than a pre-configured multiple maneuver distance, the first maneuver is returned and the process continued using the next maneuver. If the distance between maneuvers is less than the multiple maneuver distance, both maneuvers are marked as multiple maneuvers and another maneuver is generated. The distance between this maneuver and the last maneuver is checked. If this distance is greater than the multiple maneuver distance, the previous two maneuvers are returned. If not, this latter maneuver is also marked as a multiple maneuver, another maneuver is generated, and so on, until a maneuver is found that is a greater distance from its predecessor maneuver than the multiple maneuver distance.

VII. Addition of Further Maneuver Types

In the embodiment described above, 49 different maneuver types are defined. These 49 maneuver types may account for many or all the types of maneuvers that a user may require in a navigation system. However, in alternative embodiments, fewer or more maneuver types may be provided. For example, if the geographic database does not include data relating to certain of these maneuvers types, such as rail ferries or boat ferries, then there will be no maneuver types associated with nodes involving these data.

Maneuver types in addition to the 49 maneuver types listed in the table 90 of FIG. 7 may be defined and added. These additional maneuver types may be defined using the same 56 tests that are already provided in the table 90. In addition, existing maneuver types may be redesigned or deleted. When adding additional maneuver types, two procedures may be used.

In a first procedure, additional maneuver types may be added by imposing the same criteria on any new maneuver type that were applied to the original maneuver types. According to this procedure, a set of tests selected from the superset of 56 tests is used to define the proposed new maneuver type. This new set of tests is examined to determine whether this new set of tests uniquely defines the new maneuver type or causes any one of the original maneuver types to no longer uniquely define its associated maneuver. This can occur if the tests associated with the proposed new maneuver type, taken collectively, (1) are the same series of tests associated with any of the original maneuver types, (2) are a subset of the entire series of tests associated with any one of the original maneuver types, or (3) cause the entire series of tests associated with any one of the original maneuver types to be a subset of the entire series of tests associated with the proposed new maneuver type. If any of these conditions occurs, the proposed new maneuver type is not permitted as defined.

To implement this procedure for checking the validity of a proposed new maneuver type, a function call can be provided in conjunction with the navigation application program. Referring to FIG. 9, a user-developer who desires to add a new maneuver type can access a program 110. The program 110 may be implemented as a function call in the navigation application program 38. The program 110 (at step 112) prompts the user-developer to select a plurality of tests from among the complete collection of 56 tests that are available. Upon making the selection of the plurality of tests to be used to define the proposed new maneuver type, the user-developer enters the selection to the function 10 (at step 114). The function 110 (at step 116) performs a test, as described above, to determine whether the proposed series of tests is the same as, is subsumed in, or subsumes, any of the original series of tests associated with the original maneuver types. If the proposed series of tests is not the same as, is not a subset of any of the original maneuver types, and does not cause any of the original maneuver types to become a subset of the new maneuver type, then the new maneuver type is permitted (at step 118). If the new maneuver type is permitted, the new maneuver type is handled in the same manner as the original maneuver types and the table of maneuver types is augmented to include the new maneuver type (at step 120). However, if the series of tests for the proposed new maneuver type is not valid, the function 110 does not permit the new maneuver types to be defined (at step 122).

Another way to permit the addition of new maneuver types is to require executing the test for any new maneuver types in a particular order relative to the tests for the original maneuver types. As mentioned above in connection with the first embodiment, the tests for maneuver types can be executed in any order since the tests are selected so that they uniquely define each maneuver type. A new maneuver type can be defined that does not comply with this requirement, if a particular order of testing for maneuver types is accepted, i.e., the new subset of tests for the new maneuver type will have to be executed either before (or after) the tests for the original maneuver types in order to be sure that the correct maneuver is identified via the tests. The function call 110 described above can implement this additional requirement.

Referring again to FIG. 9, if the proposed new maneuver type does not include a unique set of tests, the user is given the option (at step 124) of adding, the new maneuver type provided that the tests for the new maneuver type are appropriately ordered relative to the original maneuver tests. The function call 110 may also define the ordering of the tests (at step 126). With this arrangement, the tests for the newly defined maneuver type are not treated the same as the tests for the original maneuver types. The tests for the new maneuver type are not merged into the table of tests for the originally defined maneuver types (see step 130). When running the maneuver generation program 76, the program flow is modified (at shown at 132) so that the tests for the new maneuver type 190 are performed in a defined order relative to the tests for the original maneuver types.

In addition to adding additional maneuver types, the table may be modified to add new tests, delete existing tests, or redesign existing tests. New tests may be added to account for new types of data available for testing. New tests may also be added so that a new maneuver type can be made unique from any original maneuver type, where that otherwise would not have been possible based upon the existing tests. Existing tests may be redesigned to modify how certain types of intersections are classified. Any of these types of changes are subject to the constraints described above in connection with the original tests and maneuver types, that is, that the set of positive results to tests that characterize a particular maneuver type be unique. This constraint applies to the addition of new tests, the modification of existing tests, or the deletion of existing tests.

Existing tests may be deleted under the same constraints. For example, an existing test may be deleted if the tests used to characterize a particular maneuver type are changed therefore rendering a particular test unnecessary, or it a particular maneuver type that required the test is deleted thereby making the test superfluous.

As mentioned above, the tests in the table may include some tests which are not used in an initial or default version of the maneuver generation program. For example, test "43" returns positive if the rank of the exit segment is greater than or equal to the rank of the entry segment. Although the default version of 49 maneuver types, described above, does not use this test, a new maneuver type may be defined that does. Such a maneuver type may be used for example to provide a maneuver instruction to reduce the likelihood of confusion when there is a difference of ranks between the entry and exit segments. Such a new maneuver type may be defined using this test, as mentioned above, in a customized version of the program.

VIII. Ordering of tests for maneuver types

As mentioned above, an advantage of providing a series of tests that uniquely identifies each maneuver type is that the tests can be conducted in any order and only one maneuver type will result. Because the series of tests has this property, the order in which the tests are performed can be arranged to increase overall speed and performance. For example, some of the tests may require more time to execute compared to other tests. To speed up performance, the maneuver types are identified that use tests that take a long time to execute and these maneuver types are tested for after maneuver types that use tests that take less time to execute. Also, testing for maneuver types that do not occur very often may be performed after testing for maneuver types that occur more frequently. Further, within the series of tests for each maneuver type, the tests can be performed in an order that increases performance and efficiency. For example, tests that tend to eliminate the maneuver type may be performed before other tests since the failure of only one test in the series of tests associated with any maneuver type is sufficient to eliminate the maneuver type (i.e. all the tests in the series of tests associated with a maneuver type do not have to be performed since only one failure eliminates the maneuver type). Of course, once a particular test is performed on a node in connection with the series of tests associated with one of the maneuver types, the result of the test is available to any subsequent series of tests performed on that node in conjunction with another of the maneuver types.

IX. Alternative Platforms and Environments

In the embodiment described above in connection with FIG. 1, the navigation system 10 is shown having a GPS system 16, sensors 20, and a compass 22. In alternative embodiments, there may be only one or two of these components, or there may be other types of components that can be used for determining the position of the navigation system 10. In still further embodiments, the navigation application program 38 may be used in a hand-held navigation unit, or in a stand-alone computer. In yet additional embodiments, the navigation application program 38 may be located in a network environment including both local networks and wide area networks, as well as online systems such as the Internet. For example, the navigation application program 38 may be located on a server on the Internet and the user interface may be implemented on a local workstation connected to the server via a conventional Internet connection.

It is intended that the foregoing detailed description be regarded as illustrative rather than limiting and that it is understood that the following claims including all equivalents are intended to define the scope of the invention.

I claim:

1. A method of operation for a computer-based navigation system that provides guidance to a user of the system for traveling along a route from an origin to a destination in a geographic area, the method comprising:

receiving a list of data entities that represent the route in said geographic area between the origin and the destination, wherein said list of data entities includes data that represent a plurality of locations along said route;

for each location of said plurality of locations along said route, determining which one maneuver type, if any, selected from a predetermined plurality of maneuver types is appropriate for said location, wherein said step of determining comprises:

performing a series of tests upon data corresponding to said location; and if a positive result is obtained in all the tests associated with one set of tests selected from a predetermined superset of tests, associating a maneuver type associated with said one set of tests with said location; and proving said guidance as a series of maneuver instructions based on the maneuver types associated with each of the locations.

2. The method of claim 1 wherein said maneuvering instructions include required instructions and advisories.

3. The method of claim 1 wherein no maneuver type is associated with a location if all the positive results to tests fail to provide one set of tests for which all the tests associated therewith have positive results.

4. The method of claim 1 wherein said predetermined plurality of maneuver types include a first group and a second group and further wherein each maneuver type of the first group is associated with a set of tests, no subset of which defines another of the sets of tests associated with another of the maneuver types in the first group, and wherein each of the maneuver types in the second group is defined by a set of tests a subset of which may define another of the maneuver types in the first group and the second group, and wherein execution of the sets of tests associated with the second group are ordered relative to the sets of tests associated with the first group.

5. The method of claim 1 wherein said steps of receiving, determining, performing, and associating are performed on a server connected to the Internet.

6. The method of claim 1 wherein said steps of receiving, determining, performing, and associating are performed in a networked environment.

7. The method of claim 1 wherein the locations are nodes.

8. The method of claim 1 wherein the computer-based navigation system is a hand-held unit.

9. A method of operation for a maneuver generation program to provide guidance as a series of maneuver instructions for traveling a route from an origin to a destination in a geographic area, said series of maneuvers instructions derived from a data list representing said route, wherein said method comprises:

provideing a table that defines a superset of tests and a plurality of maneuver types, wherein each maneuver type of said plurality of maneuver types is associated with a set of tests selected from said superset of tests; and executing at least some tests of said superset of tests until all the tests in a set of tests corresponding to one of said plurality of maneuver types are satisfied.

10. The method of claim 9 wherein said step of executing is performed for each location along said route at which a maneuver is possible.

11. The method of claim 9 wherein said step of executing is performed for each node along said route.

12. The method of claim 9 further comprising:

for each location along said route at which all the tests in a set of tests corresponding to one of said plurality of maneuver types are satisfied, forming a maneuver data structure that includes data corresponding to said location.

13. The method of claim 12 further comprising:

providing an output comprised of a plurality of maneuver data structures.

14. The method of claim 13 wherein each maneuver instruction in said series of maneuver instructions is formed from a corresponding one of said plurality of maneuver data structures.

15. The method of claim 9 wherein said maneuvering instructions are provided over the Internet.

16. A method of providing a customizable set of maneuver types in a navigation system, the method comprising:

providing a table defining a superset plurality of tests to be applied to data representing locations along a route between a first location and a second location in a geographic area, wherein said table defines a first plurality of maneuver types, each of which is associated with a unique subset of tests, wherein each subset of tests is selected from said superset plurality of tests;

accepting a user-defined proposed subset of at least one test selected from said superset plurality of tests, said user-defined proposed subset defining a proposed new maneuver type; and comparing said user-defined proposed subset of at least one test to each subset of tests associated with the first plurality of maneuver types in said table to determine the uniqueness of the user-defined proposed subset of tests defining said proposed new maneuver type.

17. The method of claim 16 further comprising the step of:

accepting said proposed new maneuver type if said user-defined proposed subset of tests is unique based upon said comparison to each subset of tests associated with the first plurality of maneuver types in said table.

18. The method of claim 16 wherein the step of accepting said proposed new maneuver type further comprises the step of:

adding the proposed new maneuver type and the user-defined proposed subset of tests associated therewith to said table.

19. The method of claim 16 further comprising the steps of:

if said user-defined proposed subset of tests is not unique based upon said comparison to at least one subset of tests associated with the first plurality of maneuver types, establishing an order in which the subset of tests defining the proposed new maneuver type are to be executed relative to the subsets of tests associated with the first plurality of maneuver types; and accepting said proposed new maneuver type.

20. The method of claim 16 further comprising the steps of:

accepting a user-defined proposed new test; and adding said user-defined proposed new test to said superset plurality of tests by augmenting said table.

* * * * *